United States Patent
Sahlin et al.

(10) Patent No.: US 11,937,308 B2
(45) Date of Patent: *Mar. 19, 2024

(54) TWO-STEP CONTENTION-BASED RANDOM ACCESS OVER RADIO RESOURCES IN LAA

(71) Applicant: Telefonaktiebolaget LM Ericsson (publ), Stockholm (SE)

(72) Inventors: Henrik Sahlin, Mölnlycke (SE); Amitav Mukherjee, Elk Grove, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 121 days.

This patent is subject to a terminal disclaimer.

(21) Appl. No.: 17/014,705

(22) Filed: Sep. 8, 2020

(65) Prior Publication Data
US 2020/0404717 A1 Dec. 24, 2020

Related U.S. Application Data

(63) Continuation of application No. 15/576,082, filed as application No. PCT/SE2016/051056 on Oct. 28, 2016, now Pat. No. 10,772,135.

(Continued)

(51) Int. Cl.
*H04W 74/08* (2009.01)
*H04W 16/14* (2009.01)
(Continued)

(52) U.S. Cl.
CPC ... *H04W 74/0841* (2013.01); *H04W 56/0005* (2013.01); *H04W 56/0045* (2013.01);
(Continued)

(58) Field of Classification Search
CPC ......... H04W 74/0841; H04W 56/0005; H04W 56/0045; H04W 16/14; H04W 74/002; H04W 74/008
See application file for complete search history.

(56) References Cited

U.S. PATENT DOCUMENTS

| 9,648,641 | B2 | 5/2017 | Sun et al. |
| 2009/0086698 | A1* | 4/2009 | Roy ............ H04W 74/0866 370/338 |

(Continued)

FOREIGN PATENT DOCUMENTS

| CN | 102325382 A | 1/2012 |
| CN | 104981022 A | 10/2015 |

(Continued)

OTHER PUBLICATIONS

3GPP TS 36.321 V12.7.0 (Sep. 2015); 2015 (Year: 2015).*

(Continued)

*Primary Examiner* — Ricky Q Ngo
*Assistant Examiner* — Stephen N Steiner
(74) *Attorney, Agent, or Firm* — COATS & BENNETT, PLLC

(57) ABSTRACT

A contending radio node is configured for attempting contention-based random access. The contending radio node obtains a timing advance sequence that is susceptible to contention. The contending radio node transmits, using the same transmission advancement timing, the timing advance sequence and a contention-resolving identity to a recipient radio node. Responsive to that transmission, the contending radio node receives a response signal that indicates a contention-resolving identity and a timing advance. The contending radio node resolves any contention in its favor when the contention-resolving identity indicated by the response signal corresponds to the contention-resolving identity that the contending radio node transmitted. The contending radio node, responsive to resolving the contention in its favor, adjusts its transmission advancement timing according to the timing advance indicated by the response signal.

17 Claims, 15 Drawing Sheets

Related U.S. Application Data

(60) Provisional application No. 62/248,892, filed on Oct. 30, 2015.

(51) Int. Cl.
*H04W 56/00* (2009.01)
*H04W 74/00* (2009.01)

(52) U.S. Cl.
CPC .......... *H04W 16/14* (2013.01); *H04W 74/002* (2013.01); *H04W 74/008* (2013.01)

(56) References Cited

U.S. PATENT DOCUMENTS

| | | | |
|---|---|---|---|
| 2011/0194432 A1 | 8/2011 | Kato et al. | |
| 2015/0057011 A1* | 2/2015 | Di Girolamo | H04W 72/0446 455/454 |
| 2016/0241890 A1 | 8/2016 | Park et al. | |
| 2016/0295609 A1 | 10/2016 | Vajapeyam et al. | |
| 2019/0124687 A1* | 4/2019 | Yang | H04L 27/26 |

FOREIGN PATENT DOCUMENTS

| | | |
|---|---|---|
| WO | 2009042885 A2 | 4/2009 |
| WO | 2009151358 A1 | 12/2009 |
| WO | 2015144208 A1 | 10/2015 |
| WO | 2015144256 A1 | 10/2015 |

OTHER PUBLICATIONS

3GPP; 3GPP TS 36.321 V12.7.0 (Sep. 2015); 2015 (Year: 2015).*
3rd Generation Partnership Project, "Technical Specification Group Radio Access Network; Evolved Universal Terrestrial Radio Access (E-UTRA); Physical layer procedures (Release 12)", 3GPP TS 36.213 V12.7.0, Sep. 2015, pp. 1-241.
3rd Generation Partnership Project, "Technical Specification Group Radio Access Network; Evolved Universal Terrestrial Radio Access (E-UTRA); Radio Resource Control (RRC); Protocol specification (Release 12)", 3GPP TS 36.331 V12.7.0, Sep. 2015, pp. 1-453.
Huawei et al., "Support of UL transmission for LAA", 3GPP TSG RAN WG1 Meeting #80bis, Apr. 20-24, 2015, pp. 1-6, Belgrade, Serbia, R1-151302.
3rd Generation Partnership Project, "Technical Specification Group Radio Access Network; Evolved Universal Terrestrial Radio Access (E-UTRA); Medium Access Control (MAC) protocol specification (Release 12)", 3GPP TS 36.321 V12.7.0, Sep. 2015, pp. 1-77.
3rd Generation Partnership Project, "Technical Specification Group Radio Access Network; Evolved Universal Terrestrial Radio Access (E-UTRA); Physical channels and modulation (Release 12)", 3GPP TS 36.211 V12.7.0, Sep. 2015, pp. 1-136.
3rd Generation Partnership Project, "3rd Generation Partnership Project; Technical Specification Group Radio Access Network; Synchronisation in UTRAN Stage 2 (Release 8)", Technical Specification, 3GPP TS 25.402 V8.0.0, Dec. 1, 2008, pp. 1-51, 3GPP, France.

* cited by examiner

TWO-STEP CONTENTION-BASED RANDOM ACCESS OVER RADIO RESOURCES IN LAA

RELATED APPLICATIONS

This application is a continuation of prior U.S. application Ser. No. 15/576,082, filed 21 Nov. 2017, which was the National Stage of International Application PCT/SE2016/051056 filed 28 Oct. 2016, which claims the benefit of U.S. Provisional Application No. 62/248,892, filed 30 Oct. 2015, the entire disclosure of each being hereby incorporated by reference herein.

TECHNICAL FIELD

The present disclosure generally relates to random access over one or more radio resources, and more particularly relates to contention-based random access over one or more radio resources.

BACKGROUND

A radio node typically establishes a connection to a radio communication network using contention-based random access. Under contention-based random access, different radio nodes contend for access to the radio communication network without coordinating their access with one another, e.g., the access attempts are random and contentious. A radio node that detects its random access attempt has collided with another radio node's attempt re-attempts access, e.g., after waiting for some period of time.

Establishing a connection to a radio communication network using random access often involves a radio node establishing the proper transmission timing, so that its transmissions can be recovered by the network. A radio communication network in this regard controls the timing with which radio nodes transmit to a common destination, so that those transmissions arrive at the common destination at roughly the same time; that is, the radio nodes' transmissions arrive synchronized or time-aligned. A radio communication network does this by controlling the so-called transmission advancement timing of each radio node. A radio node's transmission advancement timing describes the amount of time, if any, that a radio node advances its transmission in time, in order for that transmission to arrive time-aligned with other nodes' transmissions, e.g., accounting for the different propagation delays of the different transmissions. Synchronizing transmission reception in this way helps maintain orthogonality between different nodes' transmissions and thereby mitigates inter-node interference.

Given the contentious nature of random access and the need for establishing transmission timing, conventional random access approaches such as those currently employed by Long Term Evolution (LTE) networks require four steps. The first two steps require the radio node to perform a transmission and the network to respond with a timing advance that establishes the radio node's transmit timing. With the proper transmit timing established, the last two steps require the radio node to perform another transmission and the network node to respond again, in order to resolve any contention that may have occurred in the first two steps.

Some contexts challenge the ability of conventional random access approaches to establish transmission timing in the face of contention, in a time-efficient manner. When performed over unlicensed radio spectrum, for example, each separate transmission in the random access procedure delays the procedure because the unlicensed radio resources must be cleared of transmission activity before that transmission occurs.

SUMMARY

According to one or more embodiments, a contending radio node attempts contention-based random access over one or more radio resources. The contending radio node in some embodiments transmits a timing advance sequence (based on which a recipient radio node can derive a timing advance) and a contention-resolving identity using the same transmission advancement timing. For example, rather than transmitting the timing advance sequence using one transmission advancement timing and then transmitting the contention-resolving identity only after adjusting that transmission advancement timing based on a response from the recipient node, the contending radio node transmits both the timing advance sequence and the contention-resolving identity using the same transmission advancement timing. In one or more embodiments, this advantageously improves the time-efficiency of random access, as compared to conventional approaches.

In some embodiments, for instance, the one or more radio resources are one or more unlicensed radio resources. The contending radio node in these and other embodiments may leverage the above-described transmission approach to maintain control of the one or more radio resources throughout transmission of the timing advance sequence and the contention-resolving identity. With control maintained, the contending radio node may condition the transmission on only a single clear channel assessment of the one or more radio resources. In one or more embodiments, this advantageously accelerates contention-based random access by reducing delay due to clear channel assessment.

More particularly, embodiments herein include a method implemented by a contending radio node for attempting contention-based random access over one or more radio resources. The method includes obtaining a timing advance sequence based on which a timing advance for transmission from the contending radio node to a recipient radio node is derivable, wherein the timing advance sequence is susceptible to contention. The method further includes obtaining a contention-resolving identity of the contending radio node. The method also comprises transmitting, using the same transmission advancement timing, the timing advance sequence and the contention-resolving identity to the recipient radio node on the one or more radio resources. The method also comprises responsive to said transmitting, receiving from the recipient radio node a response signal that indicates a contention-resolving identity as well as a timing advance derived from a timing advance sequence received by the recipient radio node. The method still further entails resolving the contention in favor of the contending radio node when the contention-resolving identity indicated by the response signal corresponds to the contention-resolving identity that the contending radio node transmitted. Finally, the method includes, responsive to resolving the contention in favor of the contending radio node, adjusting the transmission advancement timing that governs the timing advancement of transmissions from the contending radio node to the recipient radio node, according to the timing advance indicated by the response signal.

In some embodiments, the method comprises determining that the one or more radio resources are deemed clear of transmission activity. In this case, transmitting the timing advance sequence and the contention-resolving identity is performed responsive to that determining.

Alternatively or additionally, the method comprises performing a clear channel assessment on the one or more radio resources. In this case, transmitting the timing advance sequence and the contention-resolving identity is performed responsive to the clear channel assessment indicating that the one or more radio resources are clear of transmission activity. In some embodiments, the clear channel assessment is performed for a defined duration. In this case, any amount of time between transmitting the timing advance sequence and transmitting the contention-resolving identity may be less than the defined duration.

In any of these embodiments, transmitting the timing advance sequence and the contention-resolving identity may comprise maintaining control of the one or more radio resources throughout transmission of the timing advance sequence and the contention-resolving identity.

In any of these embodiments, the response signal may indicate a random access sequence to which the response signal is responsive. In this case, the method may further comprise resolving contention against the contending radio node when the contention-resolving identity indicated by the response signal does not correspond to the contention-resolving identity that the contending radio node transmitted. Responsive to resolving contention against the contending radio node, the method may comprise re-attempting contention-based random access. The method may also comprise determining a transmission power to use for said re-attempting based on whether the random access sequence indicated by the response signal corresponds to the random access sequence that the contending radio node transmitted.

Embodiments further include a method implemented by a recipient radio node for facilitating contention-based random access over one or more radio resources. The method includes receiving, from a contending radio node and on the one or more radio resources, a timing advance sequence and a contention-resolving identity of the contending radio node that have been transmitted using the same transmission advancement timing, wherein the timing advance sequence is susceptible to contention. The method further entails responsive to said receiving and based on the received timing advance sequence, deriving a timing advance for transmission from the contending radio node to the recipient radio node. The method also includes responsive to said deriving, transmitting from the recipient radio node to the contending radio node a response signal that indicates the derived timing advance as well as a contention-resolving identity that corresponds to the contention-resolving identity received from the contending radio node.

In some embodiments, this method further comprises determining that one or more radio resources are deemed clear of transmission activity. In this case, transmitting the response signal may be performed responsive to that determining.

Alternatively or additionally, the method may comprise performing a clear channel assessment on one or more radio resources. In this case, transmitting the response signal may be performed responsive to the clear channel assessment indicating that the one or more radio resources are clear of transmission activity. In some embodiments, a clear channel assessment may be performed for a defined duration. In this case, any amount of time between transmitting the timing advance and transmitting the contention-resolving identity may be less than the defined duration.

In some embodiments, the response signal may be transmitted on one or more radio resources. In this case, control of those one or more resources may be maintained by the recipient radio node throughout transmission of the response signal.

In any of the above embodiments, one or more of the time resources over which the timing advance sequence is transmitted may be the same as or may be contiguous to one or more of the time resources over which the contention-resolving identity is transmitted by the contending radio node to the recipient radio.

In any of the above embodiments, the one or more radio resources may extend in time across a single subframe. In this case, the timing advance sequence and the contention-resolving identity may be transmitted by the contending radio node to the recipient node in the single subframe.

In any of the above embodiments, the one or more radio resources may extend in time across multiple subframes. In this case, the timing advance sequence and the contention-resolving identity may be transmitted by the contending radio node to the recipient node in consecutive subframes.

In any of the above embodiments, the method may further comprise determining a frequency offset between one or more radio resources on which the timing advance sequence is transmitted and one or more radio resources on which the contention-resolving identity is transmitted by the contending radio node to the recipient node, based on one or more predefined rules. In some embodiments, the one or more predefined rules specify the frequency offset as a function of at least one of: the timing advance sequence; one or more frequency resources on which the timing advance sequence is to be transmitted; one or more time resources on which the timing advance sequence is to be transmitted; an estimated path loss between the contending radio node and the recipient radio node; and system information broadcast by the recipient radio node.

In any of the above embodiments, the timing advance sequence and/or the contention-resolving identity may be transmitted by the contending radio node to the recipient node on non-contiguous frequency resources. In some embodiments, the non-contiguous frequency resources on which the timing advance sequence and/or the contention-resolving identity are respectively transmitted by the contending radio node to the recipient node may be evenly distributed in frequency.

In any of the above embodiments, the timing advance sequence may be transmitted within one or more symbols preceding the contention-resolving identity within the same subframe and may be transmitted across a frequency interval that is larger than a frequency interval over which the contention-resolving identity is transmitted.

In any of the above embodiments, the timing advance sequence may be a function of a slot or frame number in which it is transmitted, and/or an estimated path loss between the contending radio node and the recipient radio node.

In any of the above embodiments, the response signal may be transmitted on one or more unlicensed radio resources.

In any of the above embodiments, the response signal may further indicate a random access sequence to which the response signal is responsive.

In any of the above embodiments, any amount of time between the contention-resolving identity and the timing advance in the response signal may be less than a defined duration for performing a clear channel assessment on one or more radio resources.

In any of the above embodiments, one or more of the time resources over which the timing advance is transmitted may be the same as or may be contiguous to one or more of the time resources over which the contention-resolving identity is transmitted by the recipient radio to the contending radio node.

In any of the above embodiments, the response signal may extend in time across a single subframe. Alternatively, in any of the above embodiments, the response signal may extend in time across consecutive subframes.

In any of the above embodiments, the contention-resolving identity transmitted by the contending radio node may be transmitted in time as a sequence of symbol groups, with each symbol group comprising consecutive symbols that convey the same data.

In any of the above embodiments, the contention-resolving identity transmitted by the contending radio node may be transmitted in time as a sequence of symbol pairs, with each symbol pair comprising a head symbol that has a cyclic prefix portion and a tail symbol that has a cyclic postfix portion, wherein the tail symbol is contiguous in time after the head symbol and has the same data portion as the head symbol. Alternatively, in any of the above embodiments, the contention-resolving identity transmitted by the contending radio node may be transmitted in time as a sequence of symbol pairs, with each symbol pair comprising a head symbol that has a cyclic prefix portion and a tail symbol that is contiguous in time after the head symbol and has the same data portion as the head symbol.

In any of the above embodiments, the contending radio node and the recipient radio node may communicate using Orthogonal Frequency Division Multiplexing (OFDM).

In any of the above embodiments, the timing advance sequence may comprise a random access preamble transmitted over a physical random access channel (PRACH) and the contention-resolving identity may be transmitted from the contending radio node to the recipient radio node over a physical uplink shared channel (PUSCH) in a system that is or evolves from Long Term Evolution (LTE).

In any of the above embodiments, the contention-resolving identity transmitted from the contending radio node to the recipient radio node may comprise either a cell radio network temporary identifier (C-RNTI) of the contending radio node or a core-network terminal identifier of the contending radio node that is mapped to the C-RNTI of the contending radio node, and the contention-resolving identity indicated by the response signal may be the C-RNTI of the contending radio node.

In any of the above embodiments, the timing advance sequence and the contention-resolving identity may be transmitted by the contending radio node as part of a process for initially accessing a radio communication network.

In any of the above embodiments, the one or more radio resources may comprise unlicensed radio resources. Alternatively, in any of the above embodiments, the one or more radio resources may comprise license-shared radio resources.

In any of the above embodiments, the one or more radio resources may comprise radio resources of a wireless local area network (WLAN).

In any of the above embodiments, the contending radio node may be a user equipment and the recipient radio node may be a base station.

Embodiments herein also include corresponding apparatus, computer programs, and carriers.

For example, some embodiments include a contending radio node for attempting contention-based random access over one or more radio resources. The contending radio node is configured to obtain a timing advance sequence based on which a timing advance for transmission from the contending radio node to a recipient radio node is derivable, wherein the timing advance sequence is susceptible to contention. The contending radio node is also configured to obtain a contention-resolving identity of the contending radio node. The contending radio node is further configured to transmit, using the same transmission advancement timing, the timing advance sequence and the contention-resolving identity to the recipient radio node on the one or more radio resources. Responsive to that transmission, the contending radio node is configured to receive from the recipient radio node a response signal that indicates a contention-resolving identity as well as a timing advance derived from a timing advance sequence received by the recipient radio node. The contending radio node is further configured to resolve the contention in favor of the contending radio node when the contention-resolving identity indicated by the response signal corresponds to the contention-resolving identity that the contending radio node transmitted. Responsive to resolving the contention in favor of the contending radio node, the contending radio node is configured to adjust the transmission advancement timing that governs the timing advancement of transmissions from the contending radio node to the recipient radio node, according to the timing advance indicated by the response signal.

Embodiments herein also include a recipient radio node for facilitating contention-based random access over one or more radio resources. The recipient radio node is configured to receive, from a contending radio node and on the one or more radio resources, a timing advance sequence and a contention-resolving identity of the contending radio node that have been transmitted using the same transmission advancement timing, wherein the timing advance sequence is susceptible to contention. Responsive to that receiving and based on the received timing advance sequence, the recipient radio node is further configured to derive a timing advance for transmission from the contending radio node to the recipient radio node. Responsive to that deriving, the recipient radio node is configured to transmit from the recipient radio node to the contending radio node a response signal that indicates the derived timing advance as well as a contention-resolving identity that corresponds to the contention-resolving identity received from the contending radio node.

DETAILED DESCRIPTION

Figure 1:
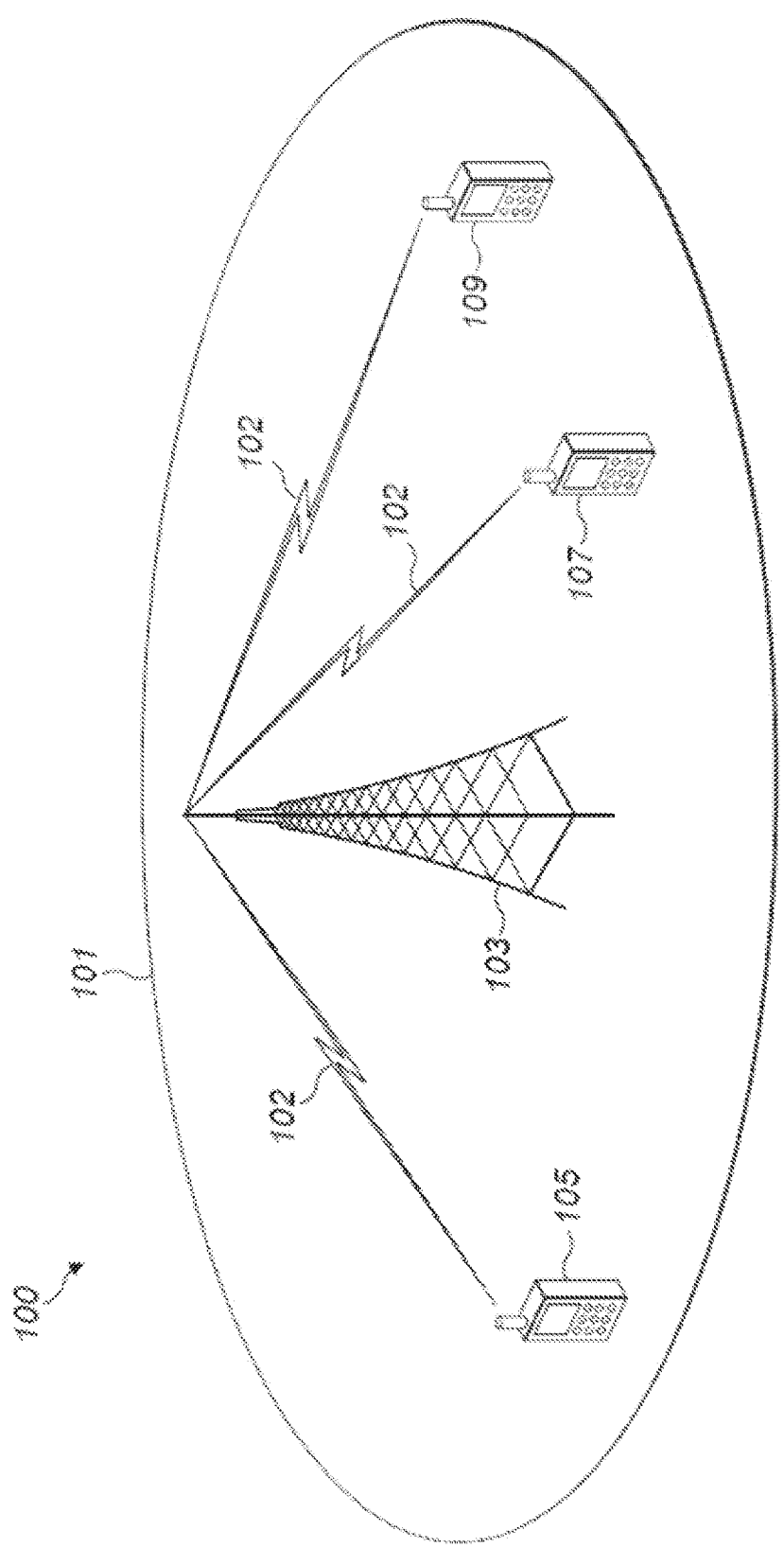
FIG. 1 is a block diagram of a radio communication network according to some embodiments.

FIG. 1 shows an example radio communication network 100. The network 100 as depicted comprises different base stations. A base station is a type of radio node. Each of the different base stations provides radio coverage for one or more geographic areas referred to as cells. FIG. 1 illustrates one such base station 103 that provides radio coverage for one or more cells including a cell 101. The base station 103 wirelessly communicates over one or more radio carriers 102 with different radio nodes (e.g., user equipment) within the coverage of the one or more cells it serves. FIG. 1 for instance shows that the base station 103 makes radio transmissions to and/or receives radio transmissions from three different radio nodes 105, 107, and 109 over the one or more radio carriers 102.

Each radio node 105, 107, and 109 in FIG. 1 establishes a connection (e.g., a radio resource connection, RRC, connection) to the network 100. A radio node may do so for instance when initially accessing the network 100 (e.g., upon power-up), or when re-establishing a connection after connection failure. Each radio node 105, 107, and 109 establishes a connection using contention-based random access. The radio nodes 105, 107, and 109 in this regard contend for access to the network 100 without coordinating their access with one another, e.g., the access attempts are random and contentious.

Establishing a connection to the network 100 using random access involves each contending radio node 105, 107, and 109 establishing the proper transmission timing. The network 100 therefore controls the timing with which the contending radio nodes 105, 107, and 109 transmit to the base station 103, so that their transmissions arrive at the base station 103 at roughly the same time; that is, the nodes' transmissions arrive synchronized or time-aligned. The network 100 does this by controlling the so-called transmission advancement timing of each radio node. A radio node's transmission advancement timing describes the amount of time, if any, that a radio node advances its transmission in time, in order for that transmission to arrive time-aligned with other radio nodes' transmissions, e.g., accounting for the different propagation delays of the different transmissions. When the radio nodes transmit in an uplink direction to a base station 103 as shown in FIG. 1, the arrival-time synchronization of the nodes' transmissions is referred to as uplink synchronization. Regardless, synchronizing the arrival time of transmissions in this way helps maintain orthogonality between different nodes' transmissions and thereby mitigates inter-node interference.

Figure 2:
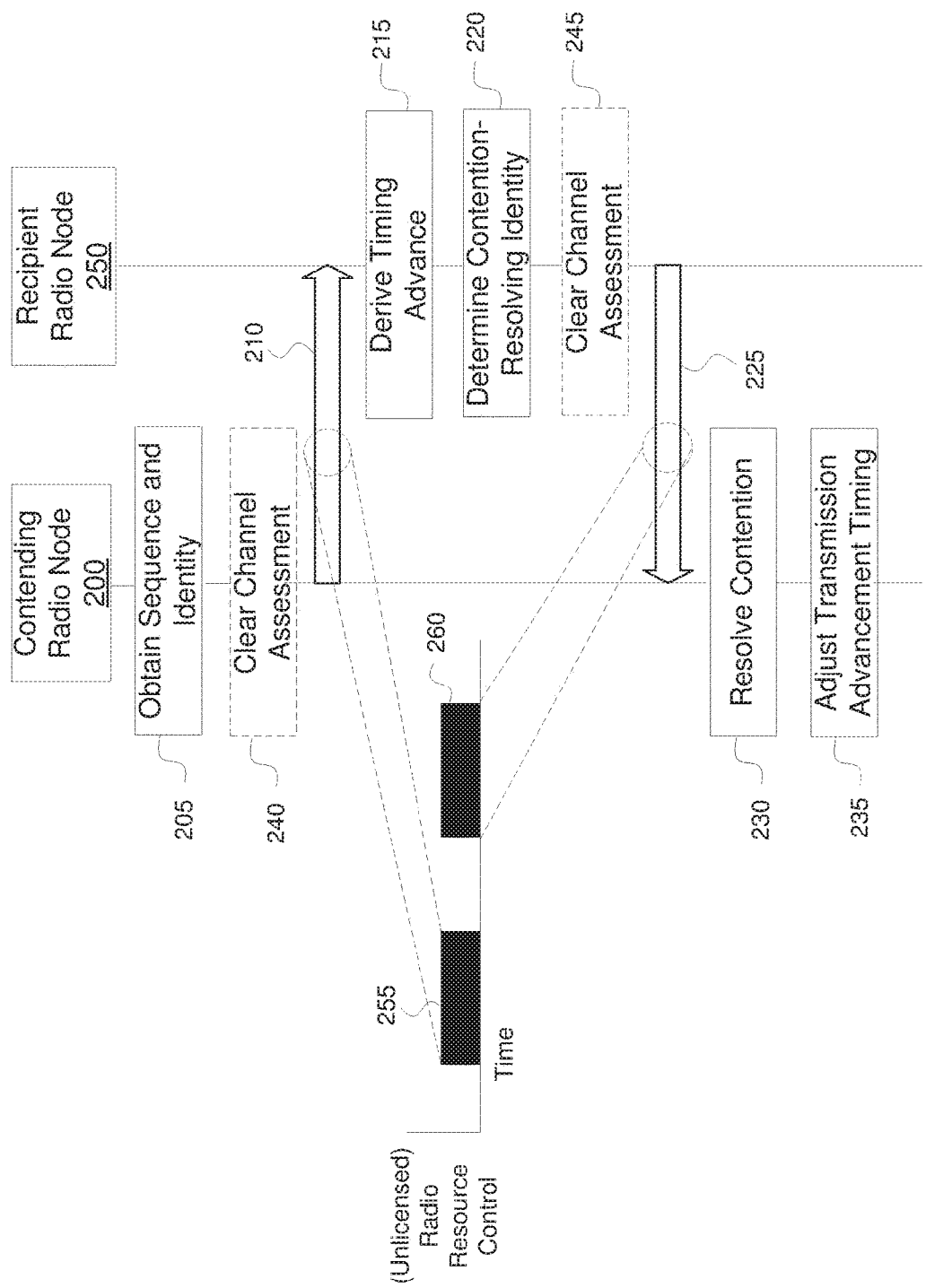
FIG. 2 illustrates logic flow diagrams for processing performed by a contending radio node and a recipient radio node according to some embodiments.

FIG. 2 illustrates how a given contending radio node 200 attempts contention-based random access over one or more radio resources (e.g., time-frequency resources), according to one or more embodiments. The contending radio node 200 obtains a timing advance sequence and a contention-resolving identity (Step 205). The timing advance sequence is a sequence (e.g., a cyclically-shifted version of a root Zadoff-Chu sequence) based on which a timing advance for transmission from the contending radio node 200 to a recipient radio node 250 is derivable. The timing advance sequence in some embodiments may be a function of a slot or frame number in which it is transmitted, and/or an estimated path loss between the contending radio node 200 and the recipient radio node 250. The timing advance sequence is susceptible to contention, though. That is, it is possible for two or more different contending radio nodes to obtain the same timing advance sequence, resulting in a collision. The contention-resolving identity in this regard is an identity (e.g., a cell radio network temporary identity, C-RNTI) that is able to resolve such contention.

The contending radio node 200 transmits the timing advance sequence and the contention-resolving identity to the recipient radio node 250 on the one or more radio resources. (Step 210). Notably, the contending radio node 200 transmits the sequence and the identity using the same transmission advancement timing. For example, rather than transmitting the timing advance sequence using one transmission advancement timing and then transmitting the contention-resolving identity only after adjusting that transmission advancement timing based on a response from the recipient node, the contending radio node transmits both the timing advance sequence and the contention-resolving identity using the same transmission advancement timing. Especially if the random access is performed upon initial network access, or in other circumstances where up-to-date advancement timing is lacking, the transmission advancement timing may be an assumed or default advancement timing (e.g., zero or some other minimal advancement).

The recipient radio node 250 may receive the timing advance sequence and contention-resolving identity transmitted by the contending radio node 200, e.g., if the channel conditions are adequate and if the transmission advance timing used does not render the transmission unrecoverable due to inter-node interference. In one or more embodiments explained in more detail later, the transmission is configured to be durable against incorrect transmission advancement timing, so as to increase the likelihood that the transmission is recoverable even when performed with a default or stale advancement timing. Alternatively or additionally, given the potential lack of arrival-time synchronization, the recipient radio node 250 may monitor for the transmission over a reception time window that is wider than the transmission duration (e.g., a multiple subframe reception window for a single subframe transmission).

Due to the nature of contention-based random access, though, the recipient radio node 250 may also or alternatively receive a similar transmission from another contending radio node (not shown). If the other node transmitted the same timing advance sequence on the same one or more radio resources, a collision occurs between these contending radio nodes. In the face of such a collision, the recipient radio node 250 in some embodiments does not distinguish the colliding transmissions from one another and/or only responds to one of the transmissions.

Whether actually received from contending radio node 200 or some other contending radio node, therefore, the recipient radio node 250 receives a timing advance sequence and a contention-resolving identity. Responsive to such reception, the recipient radio node 250 derives a timing advance based on the received timing advance sequence (Step 215). Where the timing advance sequence is a cyclically-shifted version of a root Zadoff-Chu sequence, for example, the recipient radio node 250 determines the delay of that cyclically-shifted sequence as received at the recipient radio node 250, and determines the timing advance based on that delay.

The recipient radio node 250 also determines a contention-resolving identity that corresponds to the received contention-resolving identity (Step 220). In some embodiments, this is simply the same contention-resolving identity as that received. In other embodiments, though, the recipient radio node 250 maps the received identity to another contention-resolving identity, e.g., of a different type. In one embodiment, for example, the recipient radio node 250 maps, e.g., with assistance from a core network node, the received identity in the form of a core-network terminal identifier to a C-RNTI.

In any event, responsive to deriving the timing advance and determining the contention-resolving identity, the recipient radio node 250 transmits a response signal that indicates the derived timing advance as well as the determined identity (Step 225).

As shown in FIG. 2, the contending radio node 200 receives this response signal in response to its transmission in Step 210. The contending radio node 200 uses the contention-resolving identity that it transmitted and the contention-resolving identity indicated by the response signal in order to resolve any possible contention that may have occurred during its random access attempt (Step 230). When the identity indicated by the response signal corresponds to the identity that the contending radio node 200 transmitted, the node 200 resolves contention in its favor. That is, the node 200 declares that the response signal was indeed a response to the node's own transmission and therefore indicates a timing advance appropriate for the node 200. Responsive to resolving contention in its favor, the contending radio node 200 adjusts the transmission advancement timing that governs the timing advancement of transmissions from the contending radio node 200 to the recipient radio node 250, according to the timing advance indicated by the response signal (Step 235).

In one or more embodiments, the approach illustrated by FIG. 2 advantageously improves the time-efficiency of random access, as compared to conventional approaches. FIG. 2's approach for example allows the contending radio node 200 to complete its random access transmission without having to wait for any sort of response from the recipient radio node 250. This advantageously reduces the overall time that the random access procedure takes.

Although FIG. 2's approach may apply no matter whether the radio resources used are licensed, license-shared, or unlicensed, the approach in some embodiments proves especially time-efficient when the radio resources used are unlicensed (e.g., resources of a wireless local area network, WLAN). Unlicensed radio resources can be transmitted on without having to obtain a license from a regulatory body governing those resources (e.g., the FCC in the United States). Unlicensed radio resources are therefore non-exclusive (e.g., time-shared) and subject to interference.

Accordingly, in unlicensed resource embodiments and others, the contending radio node 200 may condition its transmission (Step 210) on first determining that the one or more radio resources are deemed clear of transmission activity. In one or more embodiments, for example, the contending radio node 200 may perform a clear channel assessment (CCA) on the one or more radio resources, e.g., in accordance with carrier sense multiple access protocols (Step 240 in FIG. 2). Responsive to the assessment indicating that the one or more radio resources are clear of transmission activity, the node 200 performs its transmission (Step 210).

In at least some embodiments, the recipient radio node 250 similarly transmits its response signal (Step 225) on one or more unlicensed radio resources. The recipient radio node 250 in such case may likewise condition transmission of its response on first determining that the one or more radio resources are deemed clear of transmission activity. In one or more embodiments, for example, the recipient radio node 250 may perform a CCA on the one or more radio resources, e.g., in accordance with carrier sense multiple access protocols (Step 245 in FIG. 2). Responsive to the assessment indicating that the one or more radio resources are clear of transmission activity, the recipient radio node 250 transmits its response signal (Step 225).

In one or more embodiments, each radio node must perform a clear channel assessment in this way prior to transmitting on the one or more radio resources. In some embodiments, the embodiments in FIG. 2 improve the time-efficiency of random access by reducing the time spent on clear channel assessment. For example, rather than the radio nodes 200 and 250 each performing two separate clear channel assessments, as in conventional four-step random access approaches, the radio nodes 200 and 250 in some embodiment each only perform a single clear channel assessment 240 and 245, respectively.

The contending radio node 200 and/or the recipient radio node 250 in this regard may maintain control of the one or more radio resources throughout their transmission 210, 225, respectively. The radio resource(s) may be controlled for instance by transmitting in such a way that no other radio node has an opportunity to occupy or steal the resource(s). FIG. 2 for example illustrates the contending radio node's transmission in Step 210 as a transmission 255 that maintains control of the one or more radio resources throughout the time that the node transmits the timing advance sequence and the contention-resolving identity to the recipient radio node 250. Alternatively or additionally, FIG. 2 illustrates the recipient radio node's transmission in Step 225 as a transmission 260 that maintains control of the one or more radio resources throughout the time that the node transmits the response signal (i.e., the timing advance and the corresponding contention-resolving identity).

Any mechanism for maintaining control of the resource(s) may be used. The radio node(s) may send a preamble (e.g., a WiFi preamble), send a CTS-to-self to reserve the medium, or time the transmission in a way that ensures "blocking" transmission activity.

For example, in some embodiments, one or more of the time resources over which the contending radio node 200 transmits the timing advance sequence are the same as or are contiguous to one or more of the time resources over which the contending radio node 200 transmits the contention-resolving identity. In one embodiment, for instance, the contending radio node's transmit signal in this regard is continuous in time, e.g., so as not to "give up" the radio resources for control by other radio nodes and thereby avoid the need to perform a subsequent clear channel assessment. For example, the timing advance sequence and the contention-resolving identity may be transmitted in the same or consecutive subframes (e.g., as defined in LTE).

In other embodiments, by contrast, there may or may not be some amount of time that passes between the contending radio node's transmission of the timing advance sequence and the contending radio node's transmission of the contention-resolving identity. However, any amount of time between such transmissions is less than a defined duration for performing a clear channel assessment (CCA). Accordingly, any other radio nodes performing CCA on the one or more radio resources will not be able to clear the resource(s) of transmission activity, meaning that the contending radio node will maintain control of the resource(s) despite an interruption in its transmission.

Alternatively or additionally, one or more of the time resources over which the recipient radio node 250 transmits the timing advance are the same as or are contiguous to one or more of the time resources over which the recipient radio node 250 transmits the corresponding contention-resolving identity. For example, the timing advance and corresponding the contention-resolving identity may be transmitted in the same or consecutive subframes (e.g., as defined in LTE). And, again, in other embodiments, there may or may not be some amount of time that passes between the recipient radio node's transmission of the timing advance and the recipient radio node's transmission of the corresponding contention-resolving identity. However, any amount of time between such transmissions is less than a defined duration for performing a clear channel assessment (CCA).

Figure 3:
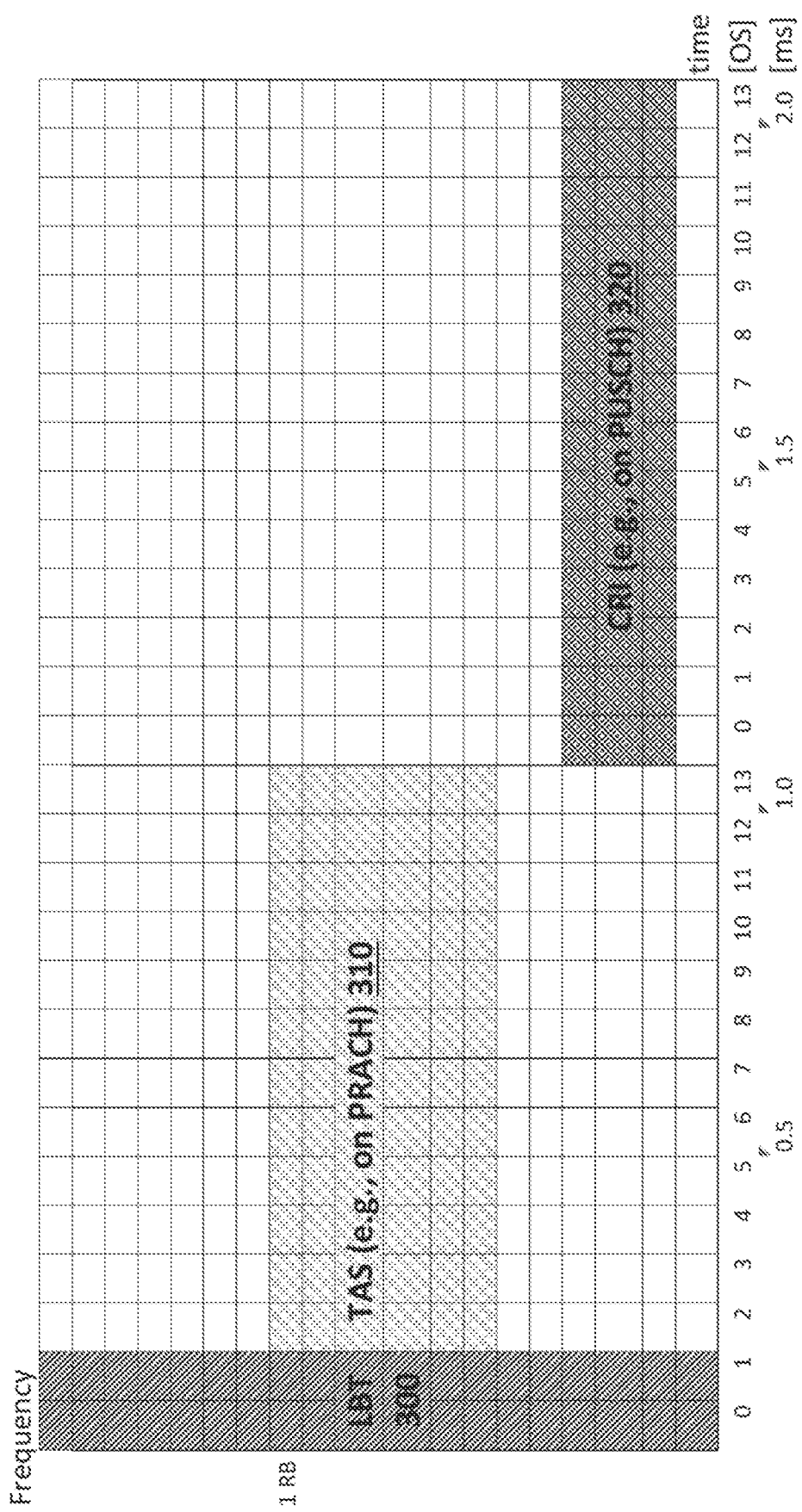
FIG. 3 is a block diagram of a transmission by a contending radio node which time-multiplexes a timing advance sequence and a contention-resolving identity according to one or more embodiments.

FIG. 3 shows a transmission by the contending radio node 200 according to one or more embodiments, with reference as an example to a context where the transmission is made according to LTE, but on unlicensed radio resources that require a listen before talk (LBT) 300 period prior to transmission. When transmitted according to LTE in this example, the timing advance sequence (TAS) 310 is a random access preamble transmitted on the physical random access channel (PRACH), and the contention-resolving identity (CRI) 320 is transmitted on the physical uplink shared channel (PUSCH). The contending radio node 200 (e.g., UE in LTE) time-multiplexes the TAS transmission 310 with the CRI transmission 320 in consecutive subframes (where in LTE each subframe comprises a 1 ms interval that constitutes two 0.5 time slots, with each time slot having 7 OFDM symbols). Specifically in the LTE example, the contending radio node 200 performs LBT 300 during the first two OFDM symbols of the first subframe, and transmits the TAS 310 on PRACH for the remaining portion of that first subframe. The contending node 200 then transmits the CRI 320 on PUSCH in the immediately following subframe.

In FIG. 3's LTE example, the PRACH occupies a partial subframe due to LBT 300 being performed in the first two symbols of that subframe. Alternatively, the LBT 300 may also be initiated prior to the subframe boundary, or the partial subframe may have puncturing located at the end of the subframe, so that LBT before transmission, e.g. of PRACH, in a next subframe may be performed at the end of the partial subframe. In some cases, therefore, the PRACH may span an entire subframe.

As shown, there is a frequency offset between one or more radio resources on which the timing advance sequence (TAS) 310 is transmitted and one or more radio resources on which the contention-resolving identity (CRI) 320 is transmitted by the contending radio node to the recipient node. This offset may be determined based on one or more predefined rules. For example, the one or more predefined rules may specify the frequency offset as a function of at least one of: (i) the timing advance sequence; (ii) one or more frequency resources on which the timing advance sequence is to be transmitted; (iii) one or more time resources on which the timing advance sequence is to be transmitted; (iv) an estimated path loss between the contending radio node and the recipient radio node; and (v) system information broadcast by the recipient radio node.

In the context of the LTE example shown in FIG. 3, for instance, the frequency location of the PUSCH transmission in the subsequent subframe is derived based on a function of one or more parameters, such as the frequency location of the PRACH, preamble index chosen by the contending radio node 200 in the PRACH, the slot or subframe number in which the random access attempt is made, the estimated path loss from the recipient radio node 250 to the contending radio node 250, and system information broadcast by the recipient radio node 250.

Figure 4:
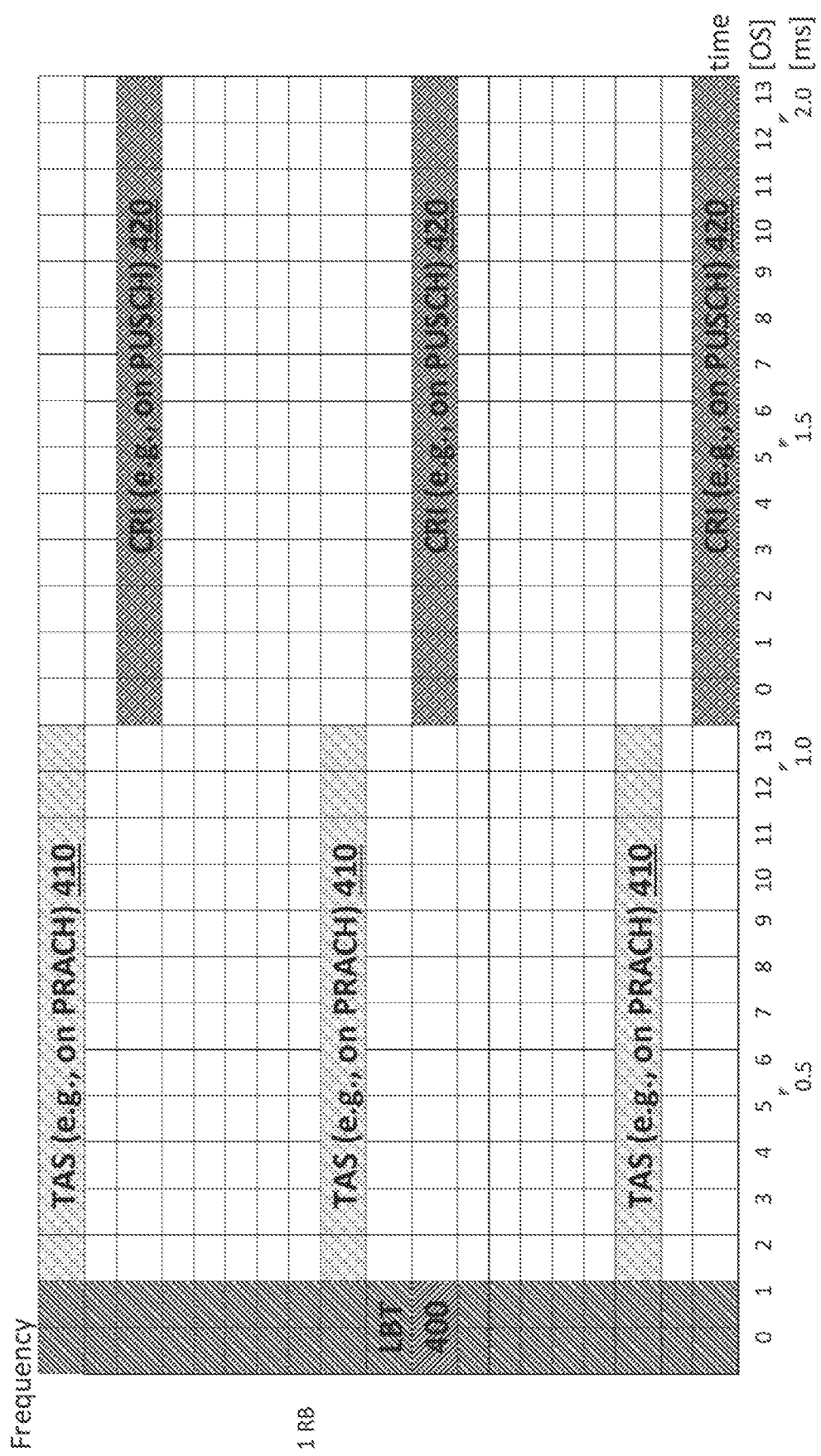
FIG. 4 is a block diagram of a transmission by a contending radio node which transmits a timing advance sequence and a contention-resolving identity on non-contiguous frequency resources according to one or more embodiments.

In some embodiments, the timing advance sequence and/or the contention-resolving identity are transmitted by the contending radio node 200 to the recipient node 250 on non-contiguous frequency resources. In one embodiment, for example, the non-contiguous frequency resources on which the timing advance sequence and/or the contention-resolving identity are respectively transmitted by the contending radio node 200 to the recipient node 250 are evenly distributed in frequency. FIG. 4 illustrates one embodiment, again with reference to an LTE example.

As shown, the TAS transmission 410 is evenly distributed in frequency, and the CRI transmission 420 is evenly distributed in frequency, with a frequency offset relative to the TAS transmission 410. In some embodiments, the frequency interval spanned by the transmissions in combination may span an entire radio carrier on which the transmissions are made.

In the context of the LTE example, one or both of the PRACH and PUSCH transmissions may be distributed across non-contiguous frequency resources which span a fraction of the uplink (UL) system bandwidth, and have a configurable, periodic spacing between the non-contiguous frequency resources.

Figure 5:
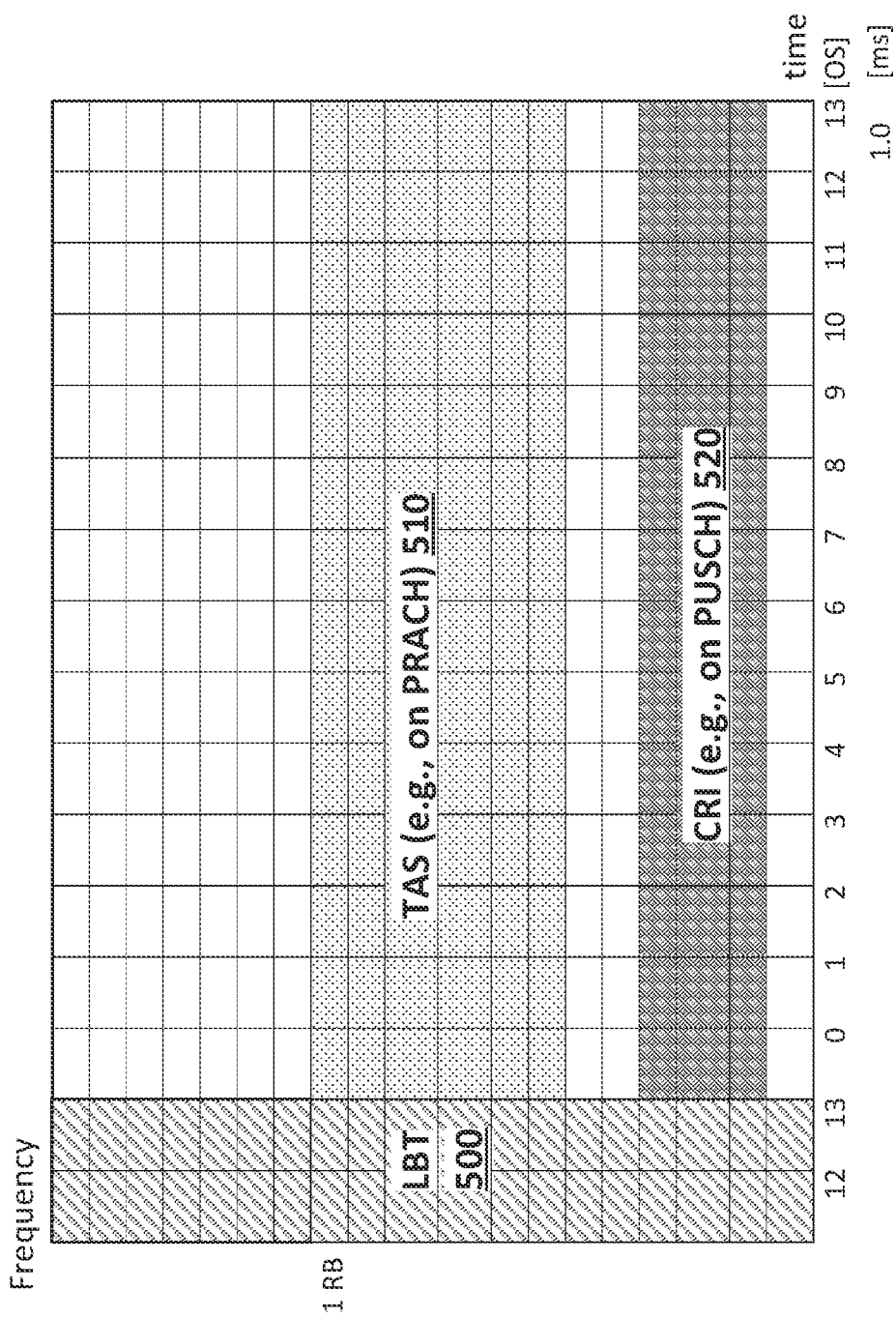
FIG. 5 is a block diagram of a transmission by a contending radio node of a timing advance sequence and a contention-resolving identity within the same subframe or transmission time interval according to one or more embodiments.

FIG. 5 illustrates alternative embodiments where the contending radio node 200 transmits the timing advance sequence (TAS) 510 and the contention-resolving identity (CRI) 520 within the same subframe or transmission time interval (TTI) (where FIG. 5 illustrates a 1 ms TTI). Moreover, as shown in FIG. 5, the LBT interval 500 is initiated and completed prior to the subframe boundary. The transmissions in FIG. 5 may likewise be distributed in frequency. That is, in the LTE example, one or both of the PRACH and PUSCH transmissions may be distributed across non-contiguous frequency resources which span a fraction of the UL system bandwidth, and have a configurable, periodic spacing between the non-contiguous frequency resources.

Figure 6:
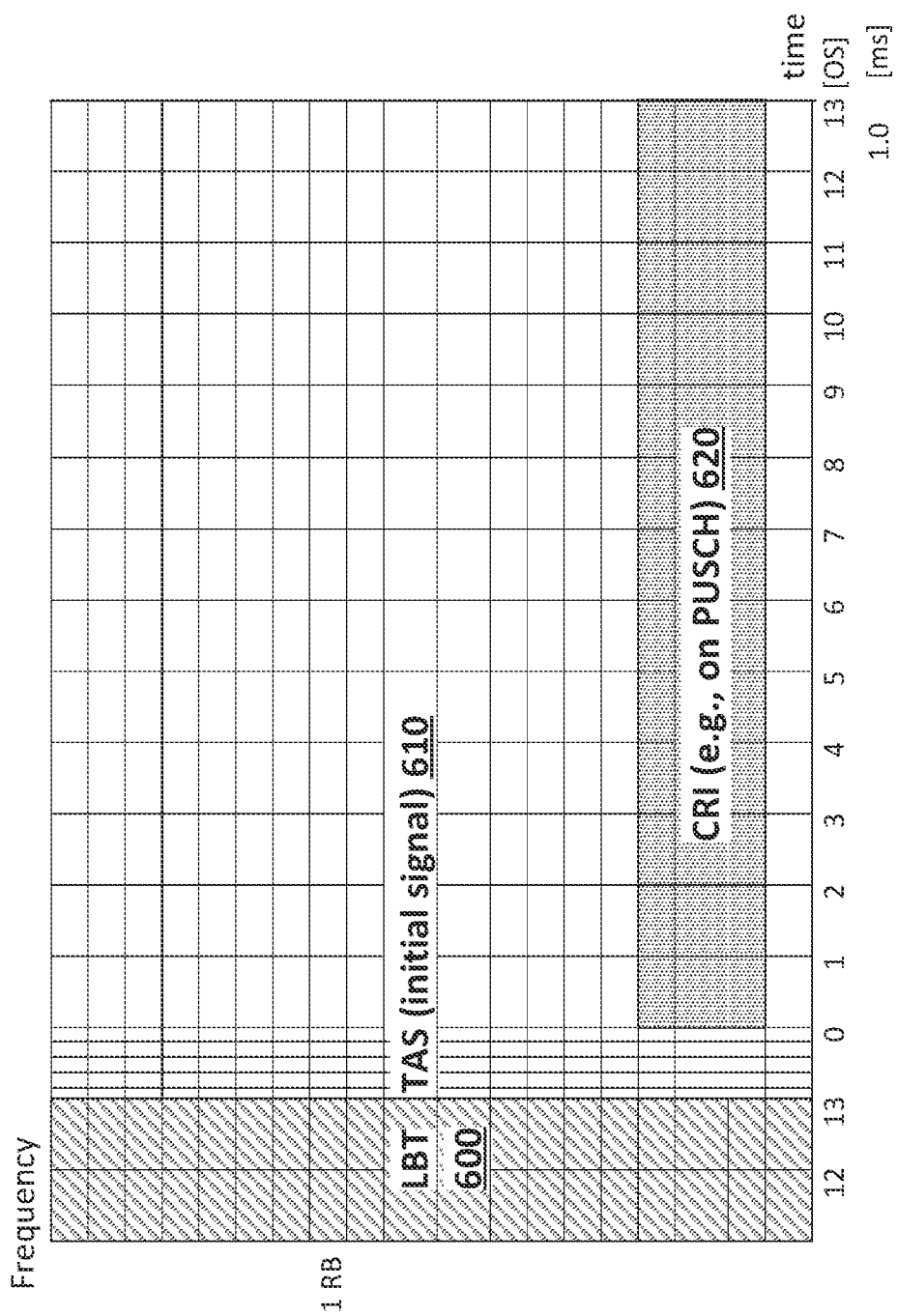
FIG. 6 is a block diagram of a transmission by a contending radio node which transmits a timing advance sequence across a frequency interval that is larger than that over which a contention-resolving identity is transmitted, according to one or more embodiments.

FIG. 6 illustrates still other embodiments. Here, the timing advance sequence 610 is transmitted within one or more symbols preceding the contention-resolving identity 620 within the same subframe and is transmitted across a frequency interval that is larger than a frequency interval over which the contention-resolving identity 620 is transmitted.

In the context of an LTE example, no PRACH is transmitted. Instead, after completing LBT 600 the contending radio node 200 transmits an initial signal that contains the timing advance sequence 610. The initial signal in FIG. 6 occupies one symbol in time, followed by the CRI 620 (e.g., as part of a connection request) on the PUSCH for the remainder of the subframe. The initial signal in some embodiments spans the entire system bandwidth. Depending upon the completion time of the LBT process, the initial signal may span one or more fractions of a symbol in addition to one or more complete symbols. Although not shown in FIG. 6, in some embodiments, puncturing may be located at the end of the subframe, to allow for performing LBT before transmission in a next subframe, if needed.

The initial signal in some embodiments contains a timing advance sequence 610 that is selected from a pre-defined set of available sequences. This sequence serves as a (e.g., non-unique) node identifier, but is subject to contention. Non-limiting examples of possible sequences include a Zadoff-Chu sequence or an m-sequence. The selection of the sequence may be random, or based upon one or more factors such as the slot or subframe number in which the random access attempt is made, and the estimated path loss from the recipient radio node 250 to the contending radio node 200. The PUSCH transmission may be distributed across non-contiguous frequency resources which span a fraction of the system bandwidth, and have a configurable, periodic spacing between the non-contiguous frequency resources.

Similar transmission schemes may be applied by the recipient radio node 250 in transmitting its response signal.

No matter the particular radio resources employed for the nodes' transmission, the contention-resolving identity transmitted by the contending radio node 200 in any of the embodiments above may be transmitted to be durable against incorrect transmission advancement timing, so as to increase the likelihood that the transmission is recoverable even when performed with a default or stale advancement timing. In one embodiment, for example, the contention-resolving identity transmitted by the contending radio node 200 is transmitted in time as a sequence of symbol groups. Each symbol group may comprise consecutive symbols (e.g., OFDM symbols) that convey the same data.

Figure 7:
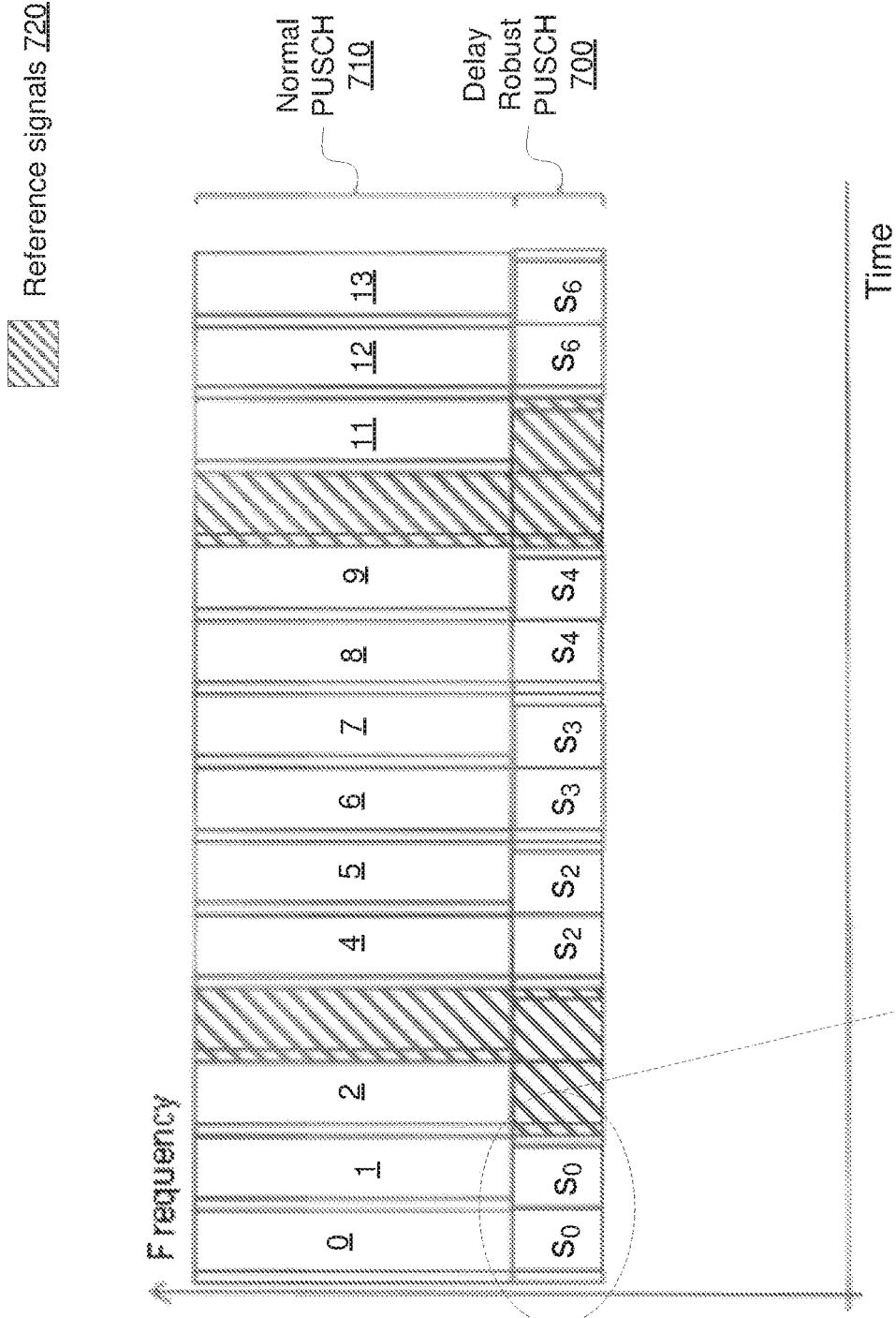
FIG. 7 is a block diagram of a transmission of a delay robust physical uplink shared channel according to some embodiments.

In one embodiment, each symbol pair comprises a head symbol that has a cyclic prefix portion and a tail symbol that has a cyclic postfix portion. The tail symbol is contiguous in time after the head symbol and has the same data portion as the head symbol. FIG. 7 illustrates an example of this in the context of LTE.

As shown, a delay robust PUSCH 700 is constructed such that it is robust for delays larger than the cyclic prefix. Unlike a normal PUSCH 710, this delay robust PUSCH 700 repeats each OFDM (or SC-FDMA) symbol two times into a pair of OFDM symbols. Here, the first OFDM (or SC-FDMA) symbol in each pair has a cyclic prefix, while the second symbol in the pair has a "cyclic postfix", i.e. the first samples of the OFDM symbols are concatenated to the end of the symbol. As shown, for instance, the delay robust PUSCH 700 repeats symbol $s_0$ two times as symbol 730A and 730B. The first repetition of symbol $s_0$ has a cyclic prefix 740 while the second repetition of symbol so has a cyclic postfix 750. The reference signals 720 (e.g., demodulation reference signals, DMRS) for PUSCH are illustrated as striped in FIG. 7.

The receiver Fast Fourier Transforms (FFTs) are aligned with the normal PUSCH symbols (since the recipient radio node 250 may need to continue receiving normal PUSCH data and therefore cannot modify its FFT alignment specifically for the durable PUSCH 700). Without any delay of PUSCH, both repeated symbols are completely included within these FFTs such that both symbols can be used for demodulation of this delay robust PUSCH 700.

Figure 8:
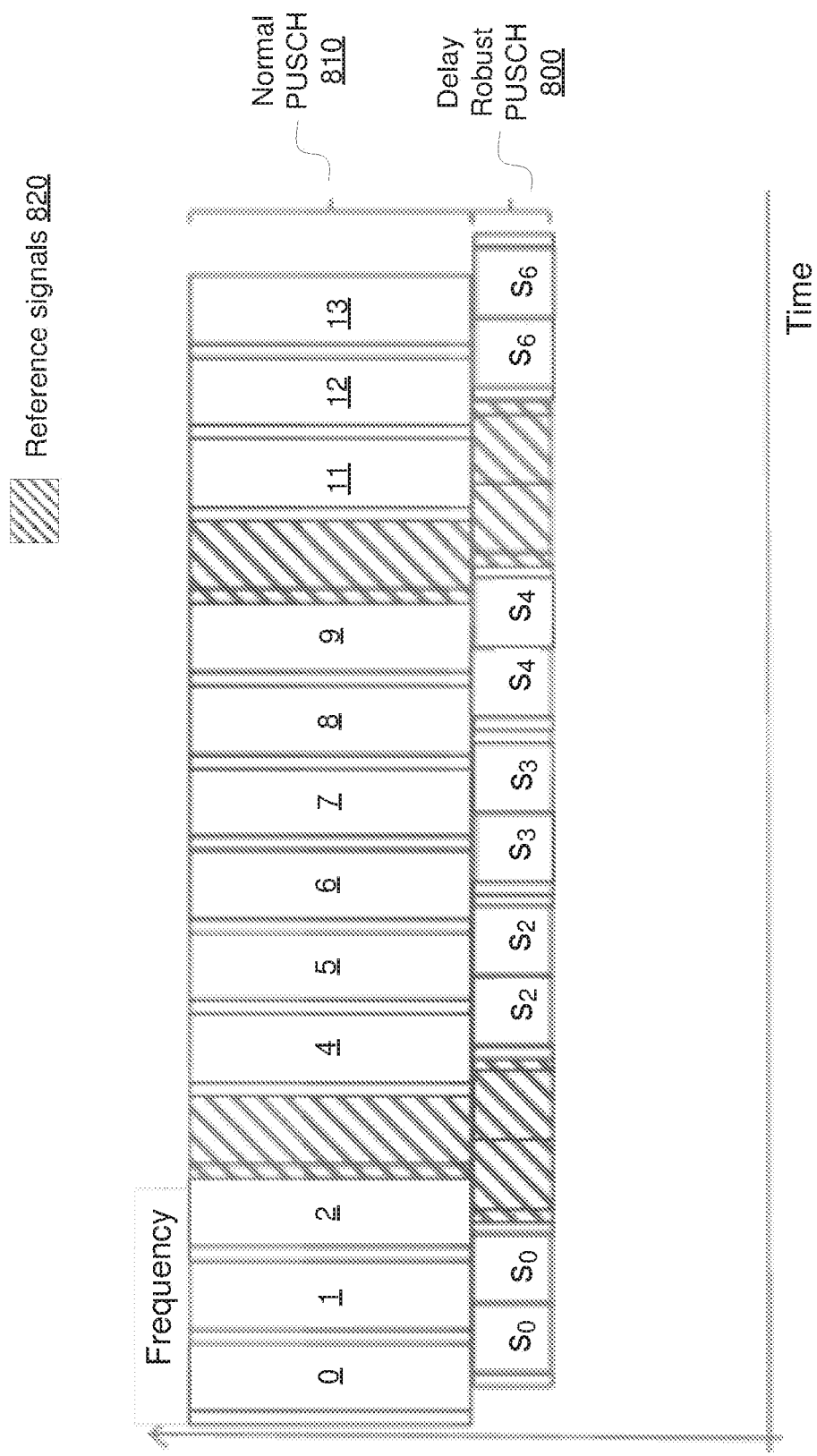
FIG. 8 is a block diagram of a transmission of a delay robust physical uplink shared channel according to other embodiments.

An illustration is given in FIG. 8 where a delay robust PUSCH 800 is delayed slightly more than the length of the cyclic prefix. Here, the delay robust PUSCH 800 can still be demodulated using one of the receiver FFTs for each repetition of the OFDM symbol. For example, the first symbol $s_0$ can be demodulated using the FFT corresponding to PUSCH symbol number "1". The delay of delay robust PUSCH 800 is in some embodiments known in the demodulation, and for selection of which receiver FFT to be used for each OFDM symbol. This delay can be estimated from the PRACH preamble, or from the reference signals 820 included.

Figure 9:
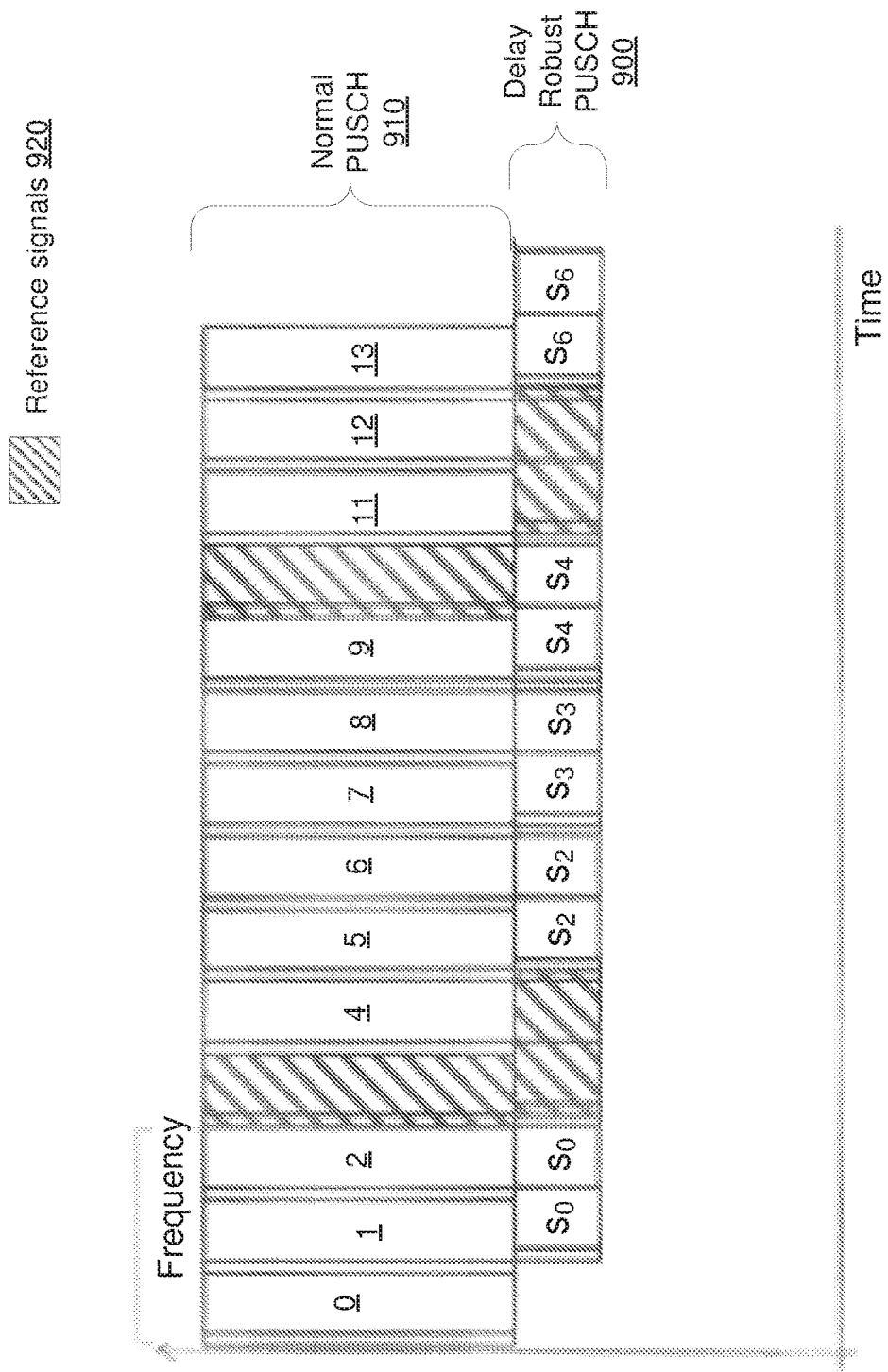
FIG. 9 is a block diagram of a transmission of a delay robust physical uplink shared channel according to still other embodiments.

An extremely large delay is illustrated in FIG. 9. The last symbol (s) in the Delay robust PUSCH 900 in FIG. 9 is received outside the sub-frame. This will result in inter symbol interference when receiving the next sub-frame. One way to avoid this interference between sub-frames is to truncate the last pair of OFDM symbols in the Delay robust PUSCH 900.

Figure 10:
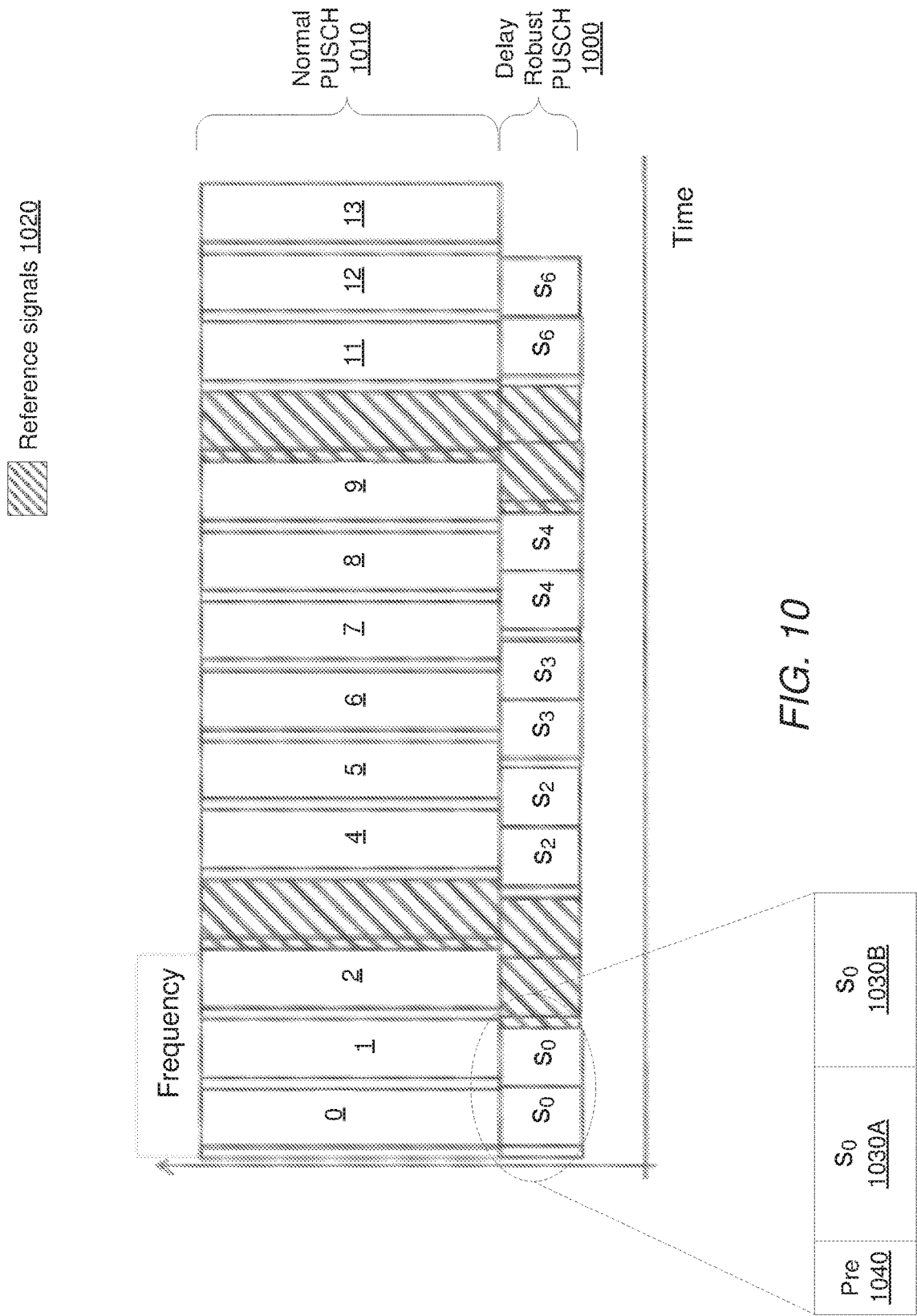
FIG. 10 is a block diagram of a transmission of a delay robust physical uplink shared channel according to yet other embodiments.

In still other embodiments, each symbol pair comprises a head symbol that has a cyclic prefix portion and a tail symbol that is contiguous in time after the head symbol and has the same data portion as the head symbol. One such embodiment of how to construct a "Delay robust PUSCH" is given in FIG. 10. Here the each pair of OFDM symbols is only preceded by a cyclic prefix, without any postfix. As shown, for instance, the delay robust PUSCH 1000 repeats symbol $s_0$ two times as symbol 1030A and 1030B. The first repetition of symbol $s_0$ has a cyclic prefix 1040 while the second repetition of symbol $s_0$ does not have either a cyclic prefix or cyclic postfix. Each symbol in the proposed PUSCH format is demodulated from the output from one of the FFTs associated with the normal PUSCH 1010. For the example in FIG. 10 the following FFTs are used: s_0 demodulated from FFT associated with PUSCH symbol "0", s_2 demodulated from FFT associated with PUSCH symbol "4", s_3 demodulated from FFT associated with PUSCH symbol "6", s_4 demodulated from FFT associated with PUSCH symbol "8", and s_6 demodulated from FFT associated with PUSCH symbol "11". Channel estimates are done using FFT from PUSCH symbol 2 and 10.

Figure 11:
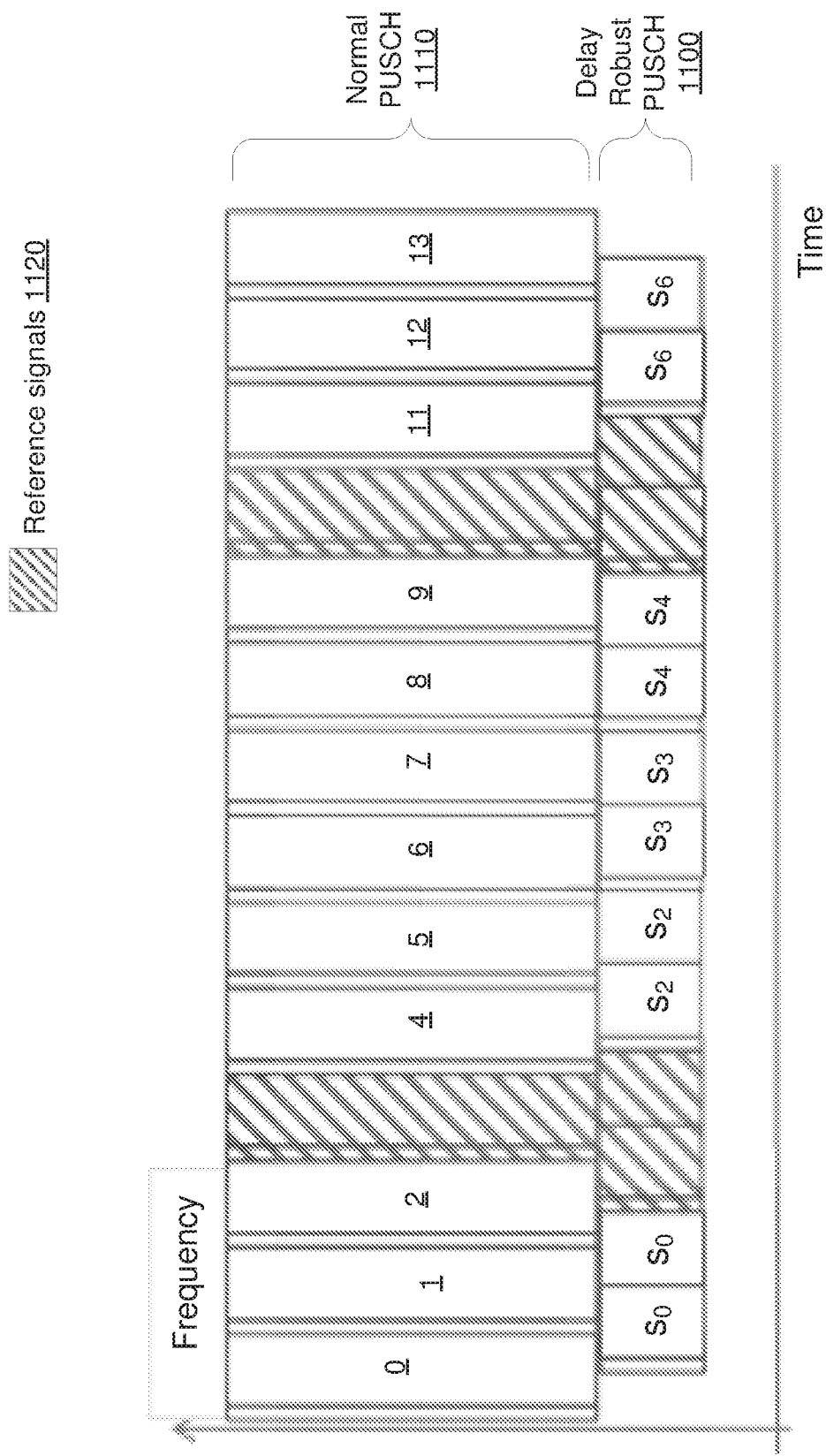
FIG. 11 is a block diagram of a transmission of a delay robust physical uplink shared channel according to some embodiments.

A delayed version of this alternative Delay robust PUSCH 1100 is given in FIG. 11. Here, the following FFTs are used: s_0 demodulated from FFT associated with PUSCH symbol "1", s_2 demodulated from FFT associated with PUSCH symbol "4", s_3 demodulated from FFT associated with PUSCH symbol "6", s_4 demodulated from FFT associated with PUSCH symbol "8", and s_6 demodulated from FFT associated with PUSCH symbol "12". Channel estimates are done using FFT from PUSCH symbol 3 and 10.

Note that in one or more embodiments, the PRACH preamble may be a long sequence as in current LTE, or be constructed based on repetition of multiple short sequences. The selection of the sequence may be random, or based upon one or more factors such as the slot or subframe number in which the Random Access (RA) attempt is made, and the estimated path loss from the recipient radio node (e.g., eNB) to the contending radio node (e.g., UE). The latter approach will make it more likely that contending radio nodes choose different preambles when contending on the same PRACH resources.

In some embodiments, the random access request (e.g., RRC connection request) in the PUSCH transmission is addressed to a temporary C-RNTI that is derived based on a function of one or more parameters, such as the preamble index chosen by the contending radio node in the PRACH, the slot or subframe number in which the RA attempt is made, and system information broadcast by the recipient radio node. The UL PUSCH transmission may use the legacy scrambling or no scrambling, and may employ convolutional coding or turbo coding.

In some embodiments, if the PRACH sequence is detected by the recipient radio node, it then attempts to locate and decode the associated PUSCH transmission. The recipient radio node then sends a message addressed to the temporary C-RNTI derived using the same rules as the contending radio node, which becomes the C-RNTI for the contending radio node. If two contending radio nodes choose the same preamble in the same PRACH slot, their associated PUSCH transmissions may still be located in non-overlapping time-frequency resources. For additional association between PUSCH transmissions and contending node identity, the PUSCH CRC may be scrambled with the contending node's temporary C-RNTI or another contending node identifier.

If the contending node correctly decodes the message from the recipient radio node and detects its own identity, it may send back an Acknowledgement (ACK). Otherwise, the contending node restarts the random access procedure in one or more embodiments.

Generally, therefore, some embodiments herein address the following problems. Up to now, the spectrum used by LTE is dedicated to LTE. This has the advantage that LTE system does not need to care about coexistence issues or uncertainties in channel access, and the spectrum efficiency can be maximized. However, the spectrum allocated to LTE is limited which cannot meet the ever increasing demand for larger throughput from applications/services. Therefore, a new industry forum has been initiated on extending LTE to operate entirely on unlicensed spectrum in a standalone mode, which is referred to as "MuLTEfire" in marketing terms by certain sources. Unlicensed spectrum can, by definition, be simultaneously used by multiple different technologies.

In the unlicensed band, a node performs LBT in order to access the channel for data transmission or sending scheduling information. For example, for the case of standalone LTE-U, the initial random access and subsequent UL transmissions take place entirely on the unlicensed spectrum. The unlicensed 5 GHz spectrum for instance is mainly used by equipment implementing the IEEE 802.11 Wireless Local Area Network (WLAN) standard, also known under its marketing brand as "Wi-Fi." Regulatory requirements may not permit transmissions in the unlicensed spectrum without prior channel sensing. Since the unlicensed spectrum must be shared with other radios of similar or dissimilar wireless technologies, a so-called listen-before-talk (LBT) method needs to be applied. LBT involves sensing the medium for a pre-defined minimum amount of time and backing off if the channel is busy.

In typical deployments of WLAN, for example, carrier sense multiple access with collision avoidance (CSMA/CA) is used for medium access. This means that the channel is sensed to perform a clear channel assessment (CCA), and a transmission is initiated only if the channel is declared as Idle. In case the channel is declared as Busy, the transmission is essentially deferred until the channel is deemed to be Idle. When the range of several access points (APs) using the same frequency overlap, this means that all transmissions related to one AP might be deferred in case a transmission on the same frequency to or from another AP which is within range can be detected. Effectively, this means that if several APs are within range, they will have to share the channel in time, and the throughput for the individual APs may be degraded.

LTE needs to consider the impact of LBT on UL procedures such as random access. LTE contention-based RA procedure on licensed carriers for initial network access conventionally consists of four steps, including Step 1: Preamble transmission on UL (known as message1 or msg 1), Step 2: Random access response on downlink (DL) (msg 2), Step 3: Layer 2/Layer 3 (L2/L3) message on UL (msg 3), and Step 4: Contention resolution message on DL (msg 4).

In step 1, the UE selects and transmits one out of 64 available PRACH sequences, where the transmission location is based on the PRACH configuration broadcast in the cell system information. In step 2, the Random Access Response (RAR) is sent by the eNB on the Physical Downlink Shared Channel (PDSCH) and indicated using the Physical Downlink Control Channel (PDCCH), and addressed with an identifier (ID), the Random Access Radio Network Temporary Identifier (RA-RNTI), identifying the time-frequency slot in which the preamble was detected. The RAR conveys the identity of the detected preamble, a timing alignment instruction to synchronize subsequent uplink transmissions from the UE, an initial uplink resource grant for transmission of the Step 3 message, and an assignment of a temporary Cell Radio Network Temporary Identifier (TC-RNTI).

In Step 3, the UE conveys the actual random access procedure message on the PUSCH, such as an RRC connection request, tracking area update, or scheduling request. It is addressed to the temporary C-RNTI allocated in the RAR at Step 2. The UE identity is also included a in this Step 3, and used later by the eNB in Step 4. If the UE is in the RRC connected state, the UE identity is the C-RNTI assigned to the UE, otherwise the UE identity is a core-network terminal identifier. In Step 4, the contention resolution message is addressed to the C-RNTI (if indicated in msg 3) or to the temporary C-RNTI, and, in the latter case, echoes the UE identity contained in msg 3. In case of a collision followed by successful decoding of msg 3, the Hybrid Automatic Repeat Request (HARQ) feedback is transmitted only by the UE which detects its own UE identity (or C-RNTI); other UEs understand there was a collision. After contention resolution, the C-RNTI is used by the eNB to address the UE that successfully completed the initial random access.

For standalone LTE in Unlicensed spectrum (LTE-U), using the current four-step LTE random access procedure for initial network access implies that up to four independent LBT procedures need to be performed, two by the UE and two by the eNB. This can significantly increase the delay in connecting to the network, and reduce the competiveness of standalone LTE-U compared to Wi-Fi. Therefore, the initial random access (RA) procedure for standalone LTE-U should involve as few transmissions as possible and also have low latency, such that the number of LBT operations can be minimized and the RA procedure can then be completed as quickly as possible.

A PUSCH requires that the UE can transmit with a timing accuracy within the cyclic prefix (4.7 microseconds for normal cyclic prefix). If the UE would not get a timing advance command from the eNB prior to PUSCH, a small cells radius is required such that the round trip delay is within the cyclic prefix. This timing requirement corresponds to a maximum cell radius significantly less than 700 meters.

A two-step random access procedure for initial access is proposed in some embodiments, which requires up to two LBT procedures compared to four LBT steps for the current LTE initial access. The UE transmits once on the UL and the eNB transmits once on the DL to complete the proposed random access procedure.

In some embodiments, random access methods herein for initial access may be completed in two steps in an LTE-based example. In step 1, the UE sends an initial identifier (e.g., a PRACH preamble sequence subject to contention) and a RRC connection request on the uplink, after potentially performing LBT. In step 2, the eNB sends a response with final UE identifier assignment, timing advance information, and contention resolution if needed, potentially after performing LBT.

The UL LBT duration in step 1 is a one-shot CCA without contention window adjustment in some embodiments. The CCA duration may be either pre-specified or indicated by the eNB via system information.

In some embodiments, the following advantages are realized. First, the number of LBT operations and therefore delay required for completing RA is minimized. Second, improved network performance of standalone LTE-U is provided in densely loaded scenarios.

Embodiments described herein are explained in the context of operating in or in association with a radio access network (RAN) that communicates over radio communication channels with radio nodes, also interchangeably referred to as wireless terminals or UEs, using a particular radio access technology. Some embodiments in this regard are explained in the context of a wireless network that uses evolved UMTS terrestrial radio access (E-UTRAN) and Long Term Evolution (LTE).

LTE uses OFDM in the downlink and Discrete Fourier Transform (DFT)-spread OFDM (also referred to as single-carrier FDMA) in the uplink. The basic LTE downlink physical resource can thus be seen as a time-frequency grid, where each resource element corresponds to one OFDM subcarrier during one OFDM symbol interval. The uplink subframe has the same subcarrier spacing as the downlink and the same number of Single Carrier Frequency Division Multiple Access (SC-FDMA) symbols in the time domain as OFDM symbols in the downlink.

In the time domain, LTE downlink transmissions are organized into radio frames of 10 ms, each radio frame consisting of ten equally-sized subframes of length Tsubframe=1 ms. Each subframe comprises two slots of duration 0.5 ms each, and the slot numbering within a frame ranges from 0 to 19. For normal cyclic prefix, one subframe consists of 14 OFDM symbols. The duration of each symbol is approximately 71.4 µs.

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

In LTE, the PRACH is used for initial network access, but the PRACH cannot carry any user data, which is exclusively sent on the PUSCH. Instead, the LTE PRACH is used to achieve uplink time synchronization for a UE which either has not yet acquired, or has lost, its uplink synchronization. The RA preamble sent on the PRACH has a structure that conventionally comprises a cyclic prefix followed by a preamble sequence derived from a Zadoff-Chu root sequence. In the time domain, the PRACH may span between one to three subframes for Frequency Division Duplex (FDD) LTE. In the frequency domain, the PRACH spans six resource blocks (1.08 MHz).

Downlink and uplink LTE transmissions are dynamically scheduled, i.e., in each subframe the base station transmits control information about which terminals can transmit in upcoming UL subframes or are transmitted to on the DL, and in which resource blocks the data is transmitted. This control signaling is typically transmitted in the first 1, 2, 3 or 4 OFDM symbols in each subframe. The downlink subframe also contains common reference symbols, which are known to the receiver and used for coherent demodulation of e.g. the control information.

It will be appreciated that the techniques may be applied to other wireless networks other than E-UTRAN and LTE, as well as to successors of the E-UTRAN. Thus, references herein to signals using terminology from the 3GPP standards for LTE should be understood to apply more generally to signals having similar characteristics and/or purposes, in other networks.

A radio node, as described herein, can be any type of node capable of communicating with another node over radio signals. In the context of the present disclosure, it should be understood that a radio node may be a wireless device or a radio network node (e.g., a base station, such as an LTE eNB). A wireless device may refer to a machine-to-machine (M2M) device, a machine-type communications (MTC) device, and/or a Narrowband-Internet of Things (NB-IoT) device. The wireless device may also be a UE, however it should be noted that the UE does not necessarily have a "user" in the sense of an individual person owning and/or operating the device. A wireless device may also be referred to as a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but are generally configured to transmit and/or receive data without direct human interaction.

In an Internet of Things (IoT) scenario, a wireless device as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a wireless device as described herein may be comprised in a vehicle and may perform monitoring and/or reporting of the vehicle's operational status or other functions associated with the vehicle.

Figure 12:
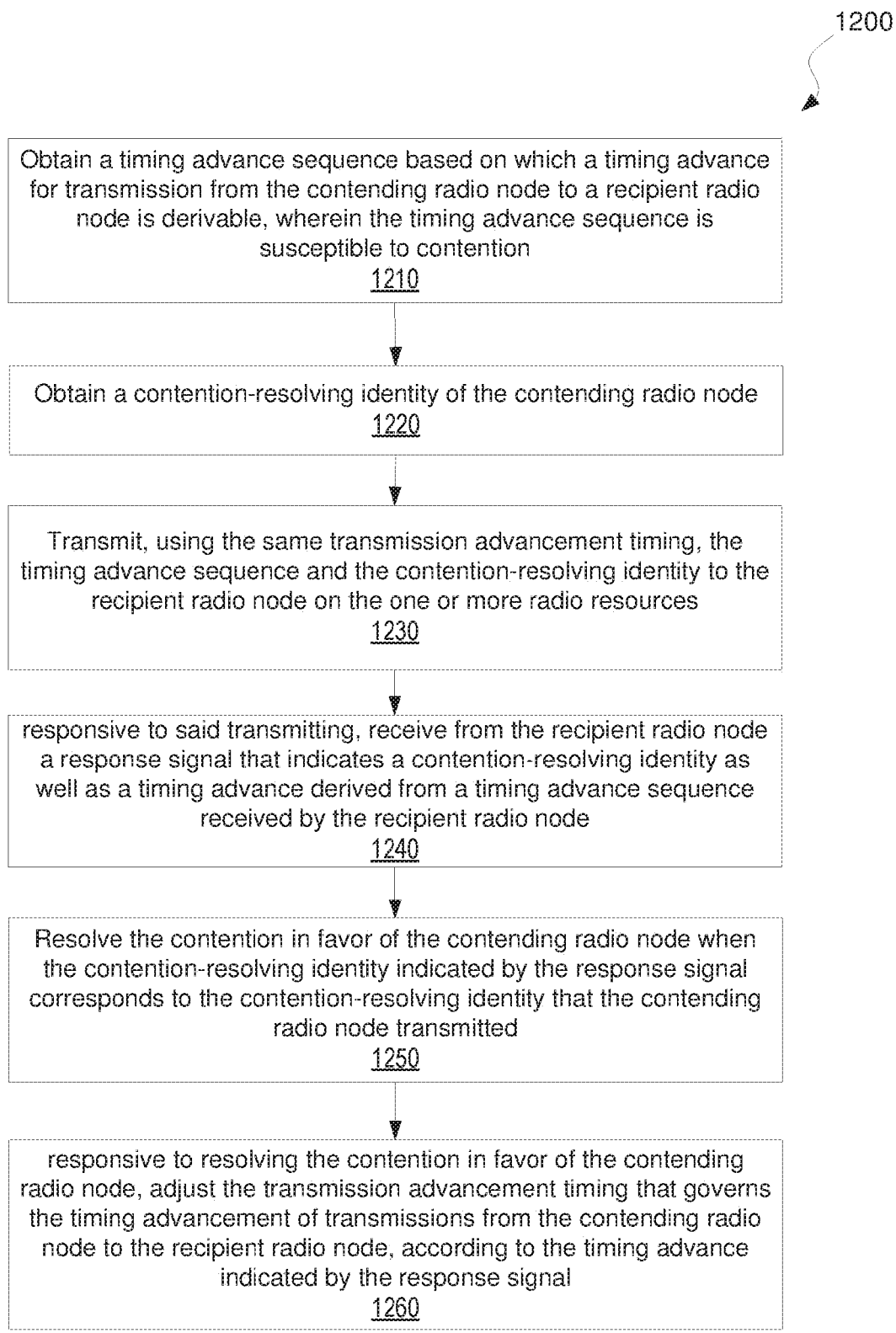
FIG. 12 is a logic flow diagram of a method performed by a contending radio node according to some embodiments.

In view of the above modifications and variations, those skilled in the art will appreciate that a contending radio node 200 herein performs the method 1200 shown in FIG. 12 for attempting contention-based random access over one or more radio resources, according to one or more embodiments. As shown, the method 1200 comprises obtaining a timing advance sequence based on which a timing advance for transmission from the contending radio node 200 to a recipient radio node 250 is derivable, wherein the timing advance sequence is susceptible to contention (Block 1210). The method 1200 also comprises obtaining a contention-resolving identity of the contending radio node 200 (Block 1220). The method 1200 further comprises transmitting, using the same transmission advancement timing, the timing advance sequence and the contention-resolving identity to the recipient radio node 250 on the one or more radio resources (Block 1230). The method 1200 also comprises responsive to said transmitting, receiving from the recipient radio node 250 a response signal that indicates a contention-resolving identity as well as a timing advance derived from a timing advance sequence received by the recipient radio node 250 (Block 1240). The method still further entails resolving the contention in favor of the contending radio node 200 when the contention-resolving identity indicated by the response signal corresponds to the contention-resolving identity that the contending radio node 200 transmitted (Block 1250). Finally, the method 1200 includes, responsive to resolving the contention in favor of the contending radio node 200, adjusting the transmission advancement timing that governs the timing advancement of transmissions from the contending radio node 200 to the recipient radio node 250, according to the timing advance indicated by the response signal (Block 1260).

Figure 13:
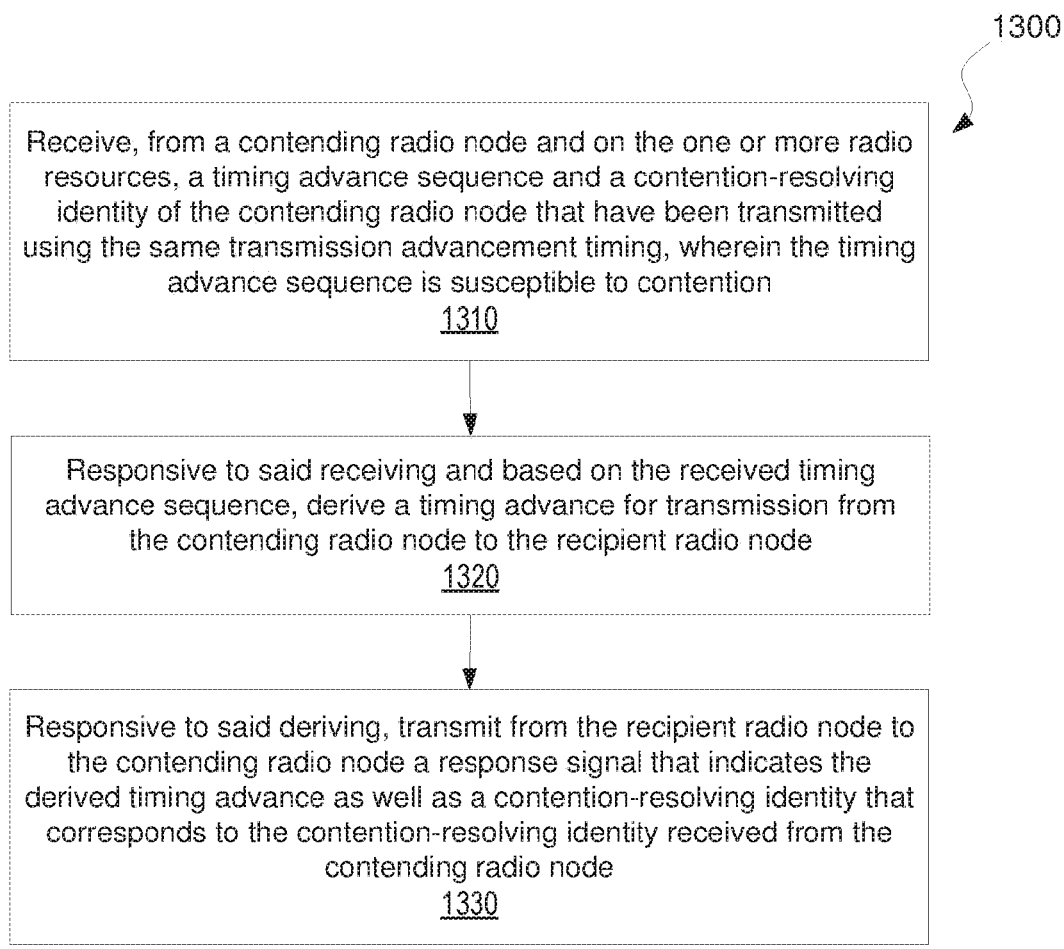
FIG. 13 is a logic flow diagram of a method performed by a recipient radio node according to some embodiments.

Those skilled in the art will appreciate that a recipient radio node 250 herein performs the method 1300 shown in FIG. 13 for facilitating contention-based random access over one or more radio resources. The method 1300 includes receiving, from a contending radio node 200 and on the one or more radio resources, a timing advance sequence and a contention-resolving identity of the contending radio node 200 that have been transmitted using the same transmission advancement timing, wherein the timing advance sequence is susceptible to contention (Block 1310). The method further entails responsive to said receiving and based on the received timing advance sequence, deriving a timing advance for transmission from the contending radio node 200 to the recipient radio node 250 (Block 1320). The method also includes responsive to said deriving, transmitting from the recipient radio node 250 to the contending radio node 200 a response signal that indicates the derived timing advance as well as a contention-resolving identity that corresponds to the contention-resolving identity received from the contending radio node 200 (Block 1330).

Note that the radio nodes 200 and 250 may each be configured to perform as described above by implementing any functional means or units. In one embodiment, for example, the radio nodes each comprise respective circuits configured to perform the respective steps shown in FIGS. 12 and 13. The circuits in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more for carrying out one or more microprocessors, carries out the techniques described herein.

Figure 14:
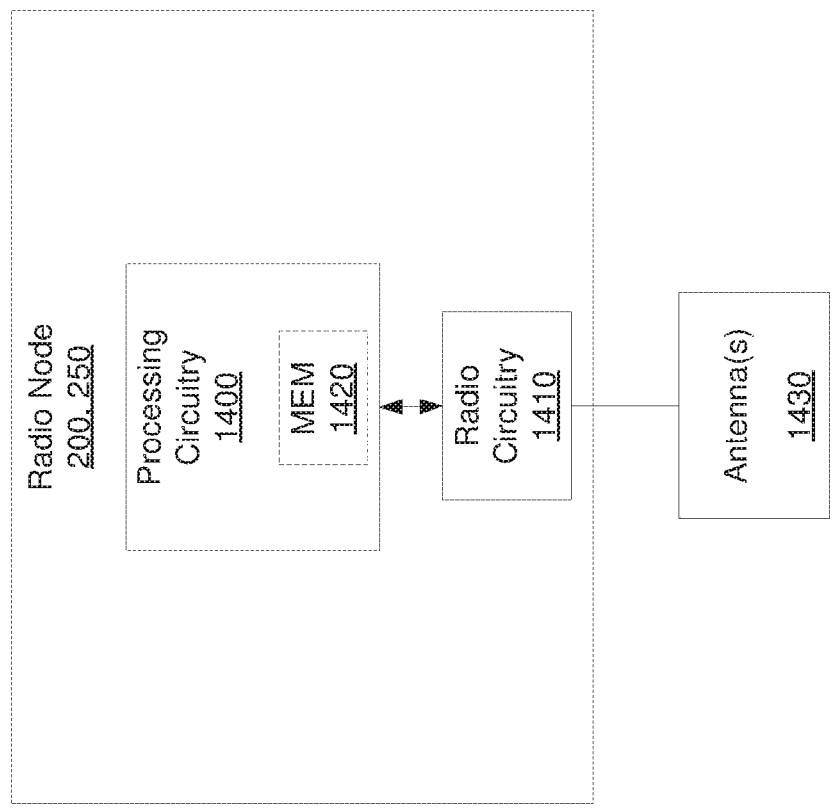
FIG. 14 is a block diagram of a radio node according to some embodiments.

In at least some embodiments as shown in FIG. 14, the radio nodes 200, 250 each comprise one or more processing circuit(s) 1400 configured to implement the above processing, such as by implementing functional means or units. In one embodiment, for example, the processing circuit(s) 1400 implement functional means or units as respective circuits. The circuits in this regard may comprise circuits dedicated to performing certain functional processing and/or one or more microprocessors in conjunction with memory 1420. In embodiments that employ memory 1420, which may comprise one or several types of memory such as read-only memory (ROM), random-access memory, cache memory, flash memory devices, optical storage devices, etc., the memory 1420 stores program code that, when executed by the one or more for carrying out one or more microprocessors, carries out the techniques described herein. The radio node 200 and/or 250 in at least some embodiments further comprises an RF circuitry 1420 configured to transmit and/or receive via one or more associated antennas 1430.

Figure 15:
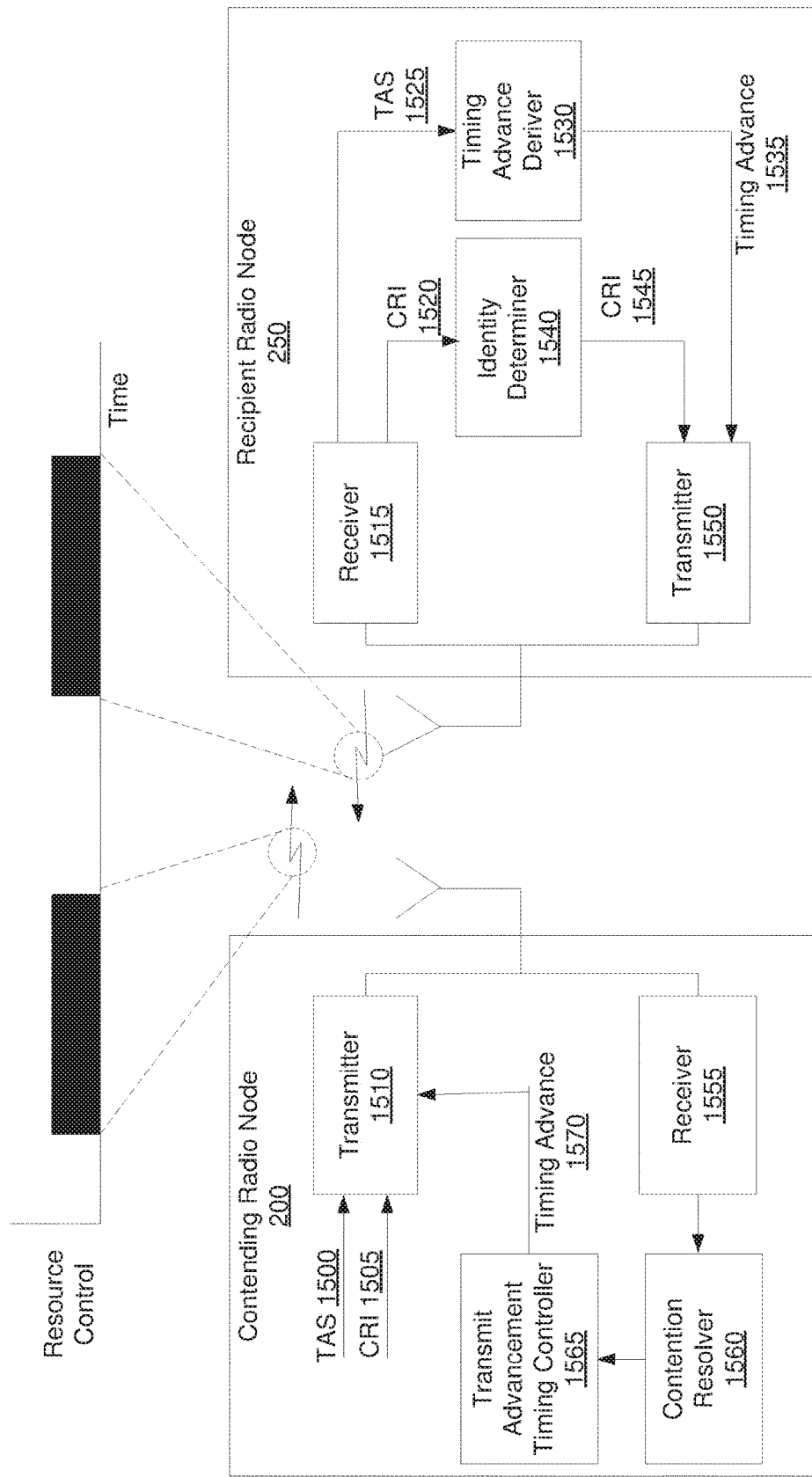
FIG. 15 is a block diagram of a contending radio node and a recipient radio node according to one or more embodiments.

FIG. 15 illustrates functional means, units, or modules at the radio nodes 200, 250 for performing the above processing. As shown, the contending radio node 200 obtains a timing advance sequence (TAS) 1500 and a contention-resolving identity (CRI) 1505. The contending radio node's transmitter 1510 transmits the TAS 1500 and CRI 1505 using the same transmission advancement timing (e.g., based on timing advance 1570). The recipient radio node's receiver receives a TAS 1520 and CRI 1525. A timing advance deriver 1530 at the recipient node 250 derives a timing advance 1535 based on the received TAS 1525. And an identity determiner 1540 at the recipient node 250 determines a CRI 1545 corresponding to the received CRI 1520. The recipient radio node's transmitter 1550 transmits the derived timing advance 1535 and corresponding CRI 1545. The contending radio node's receiver 1555 receives the timing advance 1535 and corresponding CRI 1545. A contention resolver 1560 at the contending radio node 200 resolves the contention in favor of the contending radio node 200 when the contention-resolving identity (CRI) 1545 indicated by the response signal corresponds to the contention-resolving identity (CRI) 1505 that the contending radio node 200 transmitted. The contending node's transmit advancement timing controller 1565, responsive to resolving the contention in its favor, adjusts the node's transmission advancement timing 1570 (e.g., timing advance 1570) based on the received timing advance 1535.

Those skilled in the art will also appreciate that embodiments herein further include corresponding computer programs.

A computer program comprises instructions which, when executed on at least one processor of a mesh node, cause the node to carry out any of the respective processing described above. A computer program in this regard may comprise one or more code modules corresponding to the means or units described above.

Embodiments further include a carrier containing such a computer program. This carrier may comprise one of an electronic signal, an optical signal, a radio signal, or a computer readable storage medium.

Those skilled in the art will recognize that the present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

What is claimed is:

1. A contending radio node configured for attempting contention-based random access over one or more radio resources, the contending radio node comprising:
processing circuitry and a memory, the memory containing instructions executable by the processing circuitry whereby the contending radio node is configured to:
obtain a random access preamble based on which a timing advance for transmission from the contending radio node to a recipient radio node is derivable, wherein the random access preamble is susceptible to contention;
obtain a contention-resolving identity of the contending radio node;
transmit the random access preamble and the contention-resolving identity to the recipient radio node, on the one or more radio resources, and using the same Orthogonal Frequency Division Multiplexing (OFDM) transmission advancement timing;
responsive to said transmitting, receive from the recipient radio node a response signal that indicates a contention-resolving identity as well as a timing advance;
resolve the contention in favor of the contending radio node when the contention-resolving identity indicated by the response signal corresponds to the contention-resolving identity that the contending radio node transmitted; and
responsive to resolving the contention in favor of the contending radio node, adjust the OFDM transmission advancement timing that governs the timing advancement of OFDM transmissions from the contending radio node to the recipient radio node, according to the timing advance indicated by the response signal.

2. The contending radio node of claim 1, the memory containing instructions executable by the processing circuitry whereby the contending radio node is further configured to determine that the one or more radio resources are deemed clear of transmission activity, and to transmit the random access preamble and the contention-resolving identity responsive to determining that the one or more radio resources are deemed clear of transmission activity.

3. The contending radio node of claim 1, the memory containing instructions executable by the processing circuitry whereby the contending radio node is configured to maintain control of the one or more radio resources throughout transmission of the random access preamble and the contention-resolving identity.

4. The contending radio node of claim 1, wherein one or more time resources over which the random access preamble is transmitted are the same as or are contiguous to one or more time resources over which the contention-resolving identity is transmitted by the contending radio node to the recipient radio node.

5. The contending radio node of claim 1, wherein the random access preamble is transmitted over a physical random access channel (PRACH) and the contention-resolving identity is transmitted from the contending radio node to the recipient radio node over a physical uplink shared channel (PUSCH) in a system that is or evolves from Long Term Evolution (LTE).

6. The contending radio node of claim 1, wherein the contention-resolving identity transmitted from the contending radio node to the recipient radio node comprises either a cell radio network temporary identifier (C-RNTI) of the contending radio node or a core-network terminal identifier of the contending radio node that is mapped to the C-RNTI of the contending radio node, and the contention-resolving identity indicated by the response signal is the C-RNTI of the contending radio node.

7. The contending radio node of claim 1, wherein the one or more radio resources comprise unlicensed radio resources.

8. The contending radio node of claim 1, wherein the contending radio node is a user equipment and the recipient radio node is a base station.

9. A method implemented by a contending radio node for attempting contention-based random access over one or more radio resources, the method comprising:
obtaining a random access preamble based on which a timing advance for transmission from the contending radio node to a recipient radio node is derivable, wherein the random access preamble is susceptible to contention;
obtaining a contention-resolving identity of the contending radio node;
transmitting the random access preamble and the contention-resolving identity to the recipient radio node, on the one or more radio resources, and using the same Orthogonal Frequency Division Multiplexing (OFDM) transmission advancement timing;
responsive to said transmitting, receiving from the recipient radio node a response signal that indicates a contention-resolving identity as well as a timing advance;
resolving the contention in favor of the contending radio node when the contention-resolving identity indicated by the response signal corresponds to the contention-resolving identity that the contending radio node transmitted; and
responsive to resolving the contention in favor of the contending radio node, adjusting the OFDM transmission advancement timing that governs the timing advancement of OFDM transmissions from the contending radio node to the recipient radio node, according to the timing advance indicated by the response signal.

10. The method of claim 9, wherein the random access preamble is transmitted over a physical random access channel (PRACH) and the contention-resolving identity is transmitted from the contending radio node to the recipient radio node over a physical uplink shared channel (PUSCH) in a system that is or evolves from Long Term Evolution (LTE).

11. The method of claim 9, further comprising determining that the one or more radio resources are deemed clear of transmission activity and transmitting the random access preamble and the contention-resolving identity in response.

12. The method of claim 9, further comprising maintaining control of the one or more radio resources throughout transmission of the random access preamble and the contention-resolving identity.

13. The method of claim 9, wherein one or more time resources over which the random access preamble is transmitted are the same as, or are contiguous to, one or more time resources over which the contention-resolving identity is transmitted by the contending radio node to the recipient radio node.

14. The method of claim 9, wherein the contention-resolving identity transmitted from the contending radio node to the recipient radio node comprises either a cell radio network temporary identifier (C-RNTI) of the contending radio node or a core-network terminal identifier of the contending radio node that is mapped to the C-RNTI of the contending radio node, and the contention-resolving identity indicated by the response signal is the C-RNTI of the contending radio node.

15. The method of claim 9, wherein the one or more radio resources comprise unlicensed radio resources.

16. The method of claim 9, wherein the contending radio node is a user equipment and the recipient radio node is a base station.

17. A non-transitory computer readable medium storing a computer program product for controlling a contending radio node in a wireless communication network, the computer program product comprising software instructions that, when run on processing circuitry of the contending radio node, cause the contending radio node to:

obtain a random access preamble based on which a timing advance for transmission from the contending radio node to a recipient radio node is derivable, wherein the random access preamble is susceptible to contention;

obtain a contention-resolving identity of the contending radio node;

transmit the random access preamble and the contention-resolving identity to the recipient radio node, on one or more radio resources, and using the same Orthogonal Frequency Division Multiplexing (OFDM) transmission advancement timing;

responsive to said transmitting, receive from the recipient radio node a response signal that indicates a contention-resolving identity as well as a timing advance;

resolve the contention in favor of the contending radio node when the contention-resolving identity indicated by the response signal corresponds to the contention-resolving identity that the contending radio node transmitted; and responsive to resolving the contention in favor of the contending radio node, adjust the OFDM transmission advancement timing that governs the timing advancement of OFDM transmissions from the contending radio node to the recipient radio node, according to the timing advance indicated by the response signal.

* * * * *

UNITED STATES PATENT AND TRADEMARK OFFICE
CERTIFICATE OF CORRECTION

PATENT NO. : 11,937,308 B2
APPLICATION NO. : 17/014705
DATED : March 19, 2024
INVENTOR(S) : Sahlin et al.

Page 1 of 1

It is certified that error appears in the above-identified patent and that said Letters Patent is hereby corrected as shown below:

In the Specification

In Column 13, Line 64, delete "so" and insert -- $s_0$ --, therefor.

In Column 14, Line 23, delete "(s)" and insert -- $(s_6)$ --, therefor.

In Column 16, Line 15, delete "messagel" and insert -- message1 --, therefor.

In Column 18, Line 36, delete "(NB-loT)" and insert -- (NB-IoT) --, therefor.

Signed and Sealed this
Seventeenth Day of September, 2024

Katherine Kelly Vidal
*Director of the United States Patent and Trademark Office*